(12) United States Patent
Chen et al.

(10) Patent No.: US 9,907,071 B2
(45) Date of Patent: Feb. 27, 2018

(54) RESOURCE MANAGEMENT FOR UES UNDER COVERAGE ENHANCEMENT

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/801,240

(22) Filed: Jul. 16, 2015

(65) Prior Publication Data

US 2016/0021657 A1 Jan. 21, 2016

Related U.S. Application Data

(60) Provisional application No. 62/026,477, filed on Jul. 18, 2014.

(51) Int. Cl.
*H04W 72/04* (2009.01)
*H04W 72/00* (2009.01)
(Continued)

(52) U.S. Cl.
CPC .... *H04W 72/0446* (2013.01); *H04B 17/0082* (2013.01); *H04L 5/0053* (2013.01);
(Continued)

(58) Field of Classification Search
CPC .. H04B 17/0082; H04L 5/0053; H04W 24/08; H04W 72/005; H04W 72/0406;
(Continued)

(56) References Cited

U.S. PATENT DOCUMENTS 9,398,578 B2 * 7/2016 Kim .................. H04L 5/001
2010/0027456 A1 2/2010 Onggosanusi et al.
(Continued)

OTHER PUBLICATIONS

ISA/EPO, International Search Report and Written Opinion of the International Searching Authority, Int'l App. No. PCT/US2015/040944, Oct. 6, 2015, European Patent Office, Rijswijk, NL, 11 pgs.
(Continued)

*Primary Examiner* — Mohamed Kamara
(74) *Attorney, Agent, or Firm* — Holland & Hart LLP

(57) ABSTRACT

Methods, systems, and devices are described for wireless communication within and for user equipment (UE), including lower-complexity devices, which may have intermittent communication needs, low data rates, hard-to-reach locations, and the like. Devices within a wireless communication system may utilize transmission time interval (TTI) bundling to identify and employ various encoding schemes according to particular channel, transmission, and/or environmental conditions. Devices may also monitor and/or decode control-based transmission, control-less transmission, or both. In some examples, devices may monitor various channels based on a TTI bundling length. Some or any of these techniques may allow for coverage enhancement of UEs, including low-complexity UEs.

19 Claims, 23 Drawing Sheets

(51) Int. Cl.
*H04B 17/00* (2015.01)
*H04W 24/08* (2009.01)
*H04L 5/00* (2006.01)
*H04W 88/02* (2009.01)
*H04W 88/08* (2009.01)

(52) U.S. Cl.
CPC ......... *H04W 24/08* (2013.01); *H04W 72/005* (2013.01); *H04W 72/0406* (2013.01); *H04W 88/02* (2013.01); *H04W 88/08* (2013.01)

(58) Field of Classification Search
CPC .. H04W 72/0446; H04W 88/02; H04W 88/08
See application file for complete search history.

(56) References Cited

U.S. PATENT DOCUMENTS

| | | | |
|---|---|---|---|
| 2011/0222491 A1 | 9/2011 | Vajapeyam et al. | |
| 2011/0273996 A1* | 11/2011 | Kim | H04J 11/0069 370/242 |
| 2012/0078933 A1* | 3/2012 | Kim | H04L 5/0007 707/758 |
| 2012/0201162 A1* | 8/2012 | Kim | H04B 17/345 370/252 |
| 2012/0281576 A1* | 11/2012 | Yamada | H04L 1/0046 370/252 |
| 2013/0077560 A1 | 3/2013 | Horiuchi et al. | |
| 2013/0100921 A1* | 4/2013 | Nakao | H04L 5/001 370/329 |
| 2013/0163507 A1 | 6/2013 | Hoshino et al. | |
| 2013/0205176 A1* | 8/2013 | Qian | H04L 1/0038 714/704 |
| 2014/0044056 A1 | 2/2014 | Chen et al. | |
| 2014/0071952 A1* | 3/2014 | Kim | H04L 5/001 370/335 |
| 2014/0301302 A1 | 10/2014 | Xu et al. | |
| 2014/0328260 A1* | 11/2014 | Papasakellariou | H04W 72/1289 370/329 |
| 2015/0029953 A1 | 1/2015 | Chen et al. | |
| 2016/0021658 A1 | 1/2016 | Chen et al. | |
| 2016/0164643 A1 | 6/2016 | Loehr et al. | |

OTHER PUBLICATIONS

Panasonic: "Linkage Between PDSCH/PUSCH CC and PDCCH CC for Cross Carrier Scheduling", 3GPP TSG-RAN WG1 Meeting #60bis, R1-102015, Beijing, China, Apr. 12-16, 2010, 3 pgs., 3rd Generation Partnership Project.

* cited by examiner

RESOURCE MANAGEMENT FOR UES UNDER COVERAGE ENHANCEMENT

CROSS REFERENCES

The present Application for Patent claims priority to U.S. Provisional Patent Application No. 62/026,477 by Chen et al., entitled "Resource Management for UEs Under Coverage Enhancement," filed Jul. 18, 2014, assigned to the assignee hereof, and expressly incorporated by reference herein.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system.

Generally, a wireless multiple-access communications system may include a number of base stations, each simultaneously supporting communication for multiple mobile devices or other UE devices. Base stations may communicate with UEs on downstream and upstream links. Each base station has a coverage range, which may be referred to as the coverage area of the cell. Developments in wireless communications systems have focused on smartphones, tablets, and the like. But there may be an increasing need for developments to support lower-complexity devices, including devices which may have intermittent communication needs and/or which may be located at the periphery of a base station's coverage range.

SUMMARY

The described features generally relate to improved systems, methods, and apparatuses for coverage enhancement for UEs, including lower-complexity devices, which may have intermittent communication needs, low data rates, hard-to-reach locations, and the like. Techniques are described that may be utilized for resource management of UEs under, or potentially benefitting from, coverage enhancement.

Various devices within a system utilizing transmission time interval (TTI) bundling may, for example, identify a TTI bundling length associated with a shared channel, and may determine an association between the shared channel and a control channel. Additionally or alternatively, a transport block size (TBS) of the shared channel may be identified. An encoding scheme for the shared channel may thus be determined based on the identified TTI bundling length of the shared channel, the determined association between the shared channel and the control channel, and/or the TBS.

In some examples, devices, including UEs, may monitor different search spaces for control and control-less data channels during a TTI. The UEs may thus decode a control channel from one search space and the UEs may decode a data channel from a different search space. The UEs may therefore operate in a control-based and/or control-less mode.

A method of wireless communication is described. The method may include identifying a first transmission time interval (TTI) bundling length of a first channel, identifying a second TTI bundling length of a second channel, monitoring a first search space for the first channel during a TTI based at least in part on the identified first TTI bundling length, and monitoring a second search space for the second channel during the TTI based at least in part on the identified second TTI bundling length.

An apparatus for wireless communication is described. The apparatus may include means for identifying a first TTI bundling length of a first channel, means for identifying a second TTI bundling length of a second channel, means for monitoring a first search space for the first channel during a TTI based at least in part on the identified first TTI bundling length, and means for monitoring a second search space for the second channel during the TTI based at least in part on the identified second TTI bundling length.

A further apparatus for wireless communication is described. The apparatus may include a processor, memory in electronic communication with the processor, and instructions stored in the memory and operable, when executed by the processor, to cause the apparatus to identify a first TTI bundling length of a first channel, identify a second TTI bundling length of a second channel, monitoring a first search space for the first channel during a TTI based at least in part on the identified first TTI bundling length, and monitor a second search space for the second channel during the TTI based at least in part on the identified second TTI bundling length.

A non-transitory computer-readable medium storing code for wireless communication is described. The code may include instructions executable to identify a first TTI bundling length of a first channel, identify a second TTI bundling length of a second channel, monitoring a first search space for the first channel during a TTI based at least in part on the identified first TTI bundling length, and monitor a second search space for the second channel during the TTI based at least in part on the identified second TTI bundling length.

Some examples of the method, apparatuses, or non-transitory computer-readable medium described herein may further include processes, features, means, or instructions for receiving signaling indicative of a first TTI bundling length configuration and a second TTI bundling length configuration, wherein the first search space is monitored based at least in part on the identified first TTI bundling length corresponding to the first TTI bundling length configuration, and the second search space is monitored based at least in part on the identified second TTI bundling length configuration. Additionally or alternatively, in some examples the first channel comprises a first control channel and the second channel comprises a second control channel.

In some examples of the method, apparatuses, or non-transitory computer-readable medium described herein, the first control channel or the second control channel is frequency division multiplexed with other channels during the TTI. Additionally or alternatively, some examples may include processes, features, means, or instructions for identifying a third TTI bundling length of a third channel, and monitoring a third search space for the third channel during the TTI based at least in part on the identified third TTI bundling length.

In some examples of the method, apparatuses, or non-transitory computer-readable medium described herein, the first and second channels comprise control channels and the third channel comprises a data channel that is unassociated with the first or second control channel. Additionally or alternatively, in some examples the first channel, the second channel, and the third channel are each convolutionally encoded.

In some examples of the method, apparatuses, or non-transitory computer-readable medium described herein, the first TTI bundling length and the second TTI bundling length are different. Additionally or alternatively, in some examples the first search space comprises a common search space and the first TTI bundling length is indicative of the common search space, and wherein the second search space comprises a device-specific search space and the second TTI bundling length is indicative of the device-specific search space.

In some examples of the method, apparatuses, or non-transitory computer-readable medium described herein, the first search space comprises a common search space and the first TTI bundling length is indicative of the common search space, and wherein the second search space comprises a common search space and the second TTI bundling length is indicative of the common search space. Additionally or alternatively, in some examples the first search space comprises a device-specific search space and the first TTI bundling length is indicative of the device-specific search space, and wherein the second search space comprises a device-specific search space and the second TTI bundling length is indicative of the device-specific search space.

In some examples of the method, apparatuses, or non-transitory computer-readable medium described herein, the first search space and the second search space have a same aggregation level in the TTI. Additionally or alternatively, in some examples the first search space and the second search space have different aggregation levels in the TTI.

A method of wireless communication is described. The method may include monitoring a first search space during a TTI for a first channel, and monitoring a second search space during the TTI for a second channel.

An apparatus for wireless communication is described. The apparatus may include means for monitoring a first search space during a TTI for a first channel, and means for monitoring a second search space during the TTI for a second channel.

A further apparatus for wireless communication is described. The apparatus may include a processor, memory in electronic communication with the processor, and instructions stored in the memory and operable, when executed by the processor, to cause the apparatus to monitor a first search space during a TTI for a first channel, and monitor a second search space during the TTI for a second channel.

A non-transitory computer-readable medium storing code for wireless communication is described. The code may include instructions executable to monitor a first search space during a TTI for a first channel, and monitor a second search space during the TTI for a second channel.

In some examples of the method, apparatuses, or non-transitory computer-readable medium described herein, the first channel is a control channel and the second channel is a data channel. Additionally or alternatively, some examples may include processes, features, means, or instructions for blindly decoding the control channel from the first search space, and blindly decoding the data channel from the second search space.

In some examples of the method, apparatuses, or non-transitory computer-readable medium described herein, the control channel comprises a physical control channel that schedules a corresponding shared data channel, and the data channel comprises a physical shared channel unassociated with any control channel. Additionally or alternatively, in some examples the data channel is convolutionally encoded.

Some examples of the method, apparatuses, or non-transitory computer-readable medium described herein may further include processes, features, means, or instructions for monitoring a third search space during the TTI for an additional control channel associated with broadcast transmissions. Additionally or alternatively, some examples may include processes, features, means, or instructions for enabling an unassociated data monitoring mode for a user equipment (UE), wherein monitoring the second search space is based at least in part on the enabled unassociated data monitoring mode.

In some examples of the method, apparatuses, or non-transitory computer-readable medium described herein, the first search space comprises a common search space. Additionally or alternatively, in some examples the first channel is a first data channel and the second channel is a second data channel.

Some examples of the method, apparatuses, or non-transitory computer-readable medium described herein may further include processes, features, means, or instructions for blindly decoding the first data channel from the first search space, and blindly decoding the second data channel from the second search space. Additionally or alternatively, in some examples the first search space is monitored based at least in part on a first TTI bundling length of the first channel and the second search space is monitored based at least in part on a second TTI bundling length of the second channel.

Further scope of the applicability of the described methods, apparatuses, and computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Resource management may improve coverage enhancement for user equipment (UEs) within a system. Devices within base stations and/or UEs may be configured to utilize transmission time interval (TTI) bundling to identify and employ various encoding schemes according to particular channel, transmission, and/or environmental conditions. Additionally or alternatively, devices may be configured to monitor and/or decode control-based transmission, controlless transmission, or both. In some cases, devices may also be configured to monitor various channels based on a TTI bundling length. Some or any of these techniques may allow for coverage enhancement of UEs, including low-complexity UEs. Coverage enhancement, as used herein, may refer to techniques that provide for increased signal strength—e.g., strength of signals transmitted from or received by—a UE. In some cases, coverage enhancement may refer to an effective increase in signal power realized at or by a UE.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
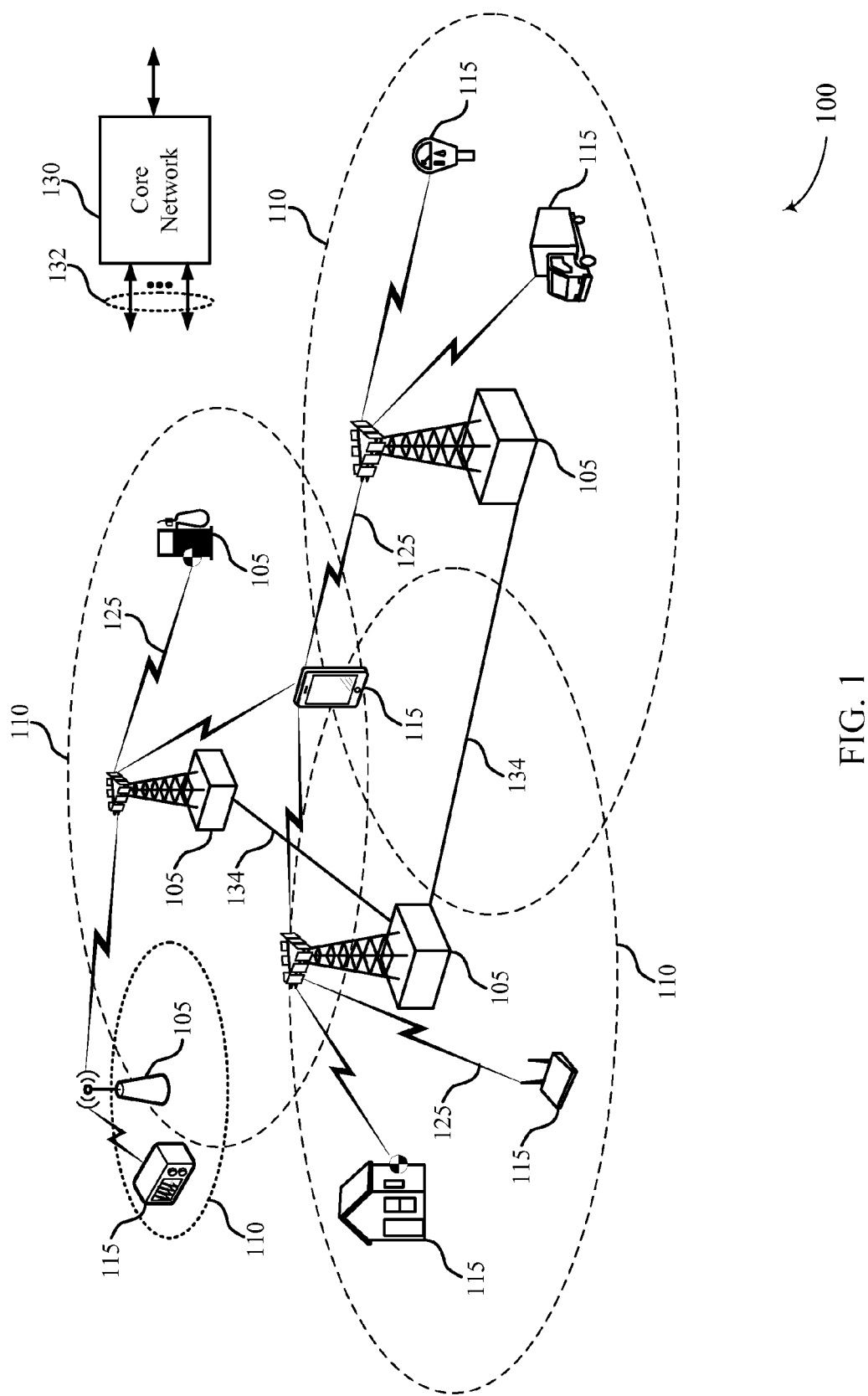
FIG. 1 illustrates an example of a wireless communications system in accordance with various aspects of the present disclosure.

FIG. 1 illustrates an example of a wireless communications system 100 in accordance with various aspects of the present disclosure. The system 100 includes base stations 105, communication devices, also known as UEs 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, evolved node B (eNB), Home NodeB, a Home eNodeB, or some other suitable terminology. The coverage area 110 for a base station may be divided into sectors making up a portion of the coverage area (not shown). The system 100 may include base stations 105 of different types (e.g., macro, micro, and/or pico base stations). There may be overlapping coverage areas for different technologies. As described below, the base stations 105 may employ coverage enhancement techniques to support various types of UEs 115, including low-complexity UEs 115, within the system 100.

The system 100 may be a Heterogeneous Long Term Evolution (LTE)/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 may be dispersed throughout the wireless communications system 100, and each UE may be stationary or mobile. A UE 115 may be able to communicate with macro eNBs, pico eNBs, femto eNBs, relays, and the like. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. While certain aspects of the system 100 may be designed to improve spectral efficiency, ubiquitous coverage, enhanced quality of service (QoS) support, and the like for such UEs 115, low-complexity (e.g., low-cost) UEs 115 may also be effectively supported by the system 100.

These low-complexity/low-cost UEs 115 may provide for automated communication. As used herein, "low-complexity" may refer to limited operating abilities and/or features of a UE 115, including limited data rates, transmit power, and the like. These devices may also be referred to as "low-cost," because they may be considerably less expensive to manufacture and operate than other wireless devices, such as smartphones, tablet computer, and the like.

Automated wireless devices may include those devices implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. Some market projections show that the number of low cost devices (e.g., MTC devices) may largely exceed today's cell phones.

In order to support an ever-increasing number of UEs 115, including low-complexity UEs 115, certain UEs 115 may communicate with a reduced maximum bandwidth as compared with legacy UEs 115—e.g., UEs 115 operating according to LTE Release 11 or prior. Such UEs 115 may also, or alternatively, be configured to with single radio frequency (RF) chain, to reduce complexity; they may also have reduced peak data rates and/or reduced transmit power capabilities. In some cases, such devices operate in a half-duplex fashion—e.g., either transmitting or receiving, but not both at the same time.

The communication links 125 shown in system 100 may include uplink (UL) transmissions from a UE 115 to a base station 105, and/or downlink (DL) transmissions, from a base station 105 to a UE 115 over DL carriers. The downlink transmissions may also be called forward link transmissions while the uplink transmissions may also be called reverse link transmissions.

The communication links 125 may, in some examples, include control-based and control-less data channels. As used herein, control-based data channels may refer to data channels scheduled by a control channel, while control-less data channels may not be scheduled by a control channel. For example, a physical downlink shared channel (PDSCH) may have an associated physical downlink control channel (PDCCH) that schedules the PDSCH, and the PDSCH may be referred to as control-based. Another PDSCH may, however, not be scheduled by a PDCCH (e.g., may not be associated with a PDCCH), but may be blindly decoded (as described below), and may be referred to as control-less. The communication links 125 may thus provide for resource management for UEs 115 under coverage enhancement within the system 100.

Figure 2:
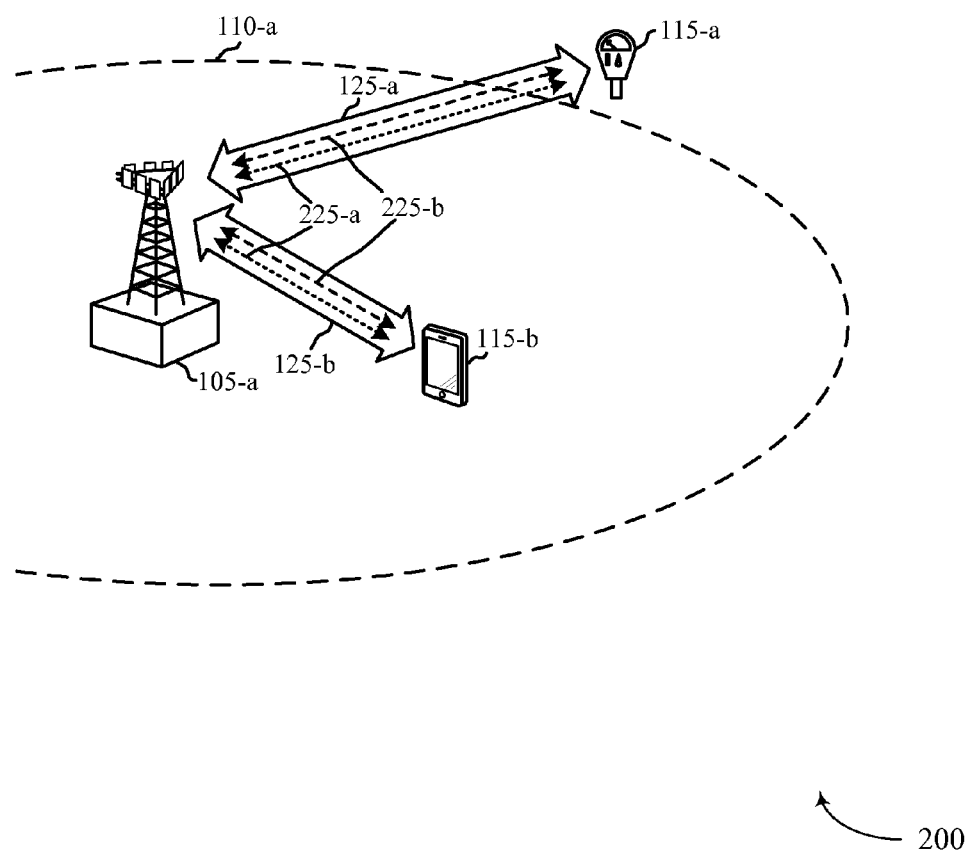
FIG. 2 illustrates an example of a wireless communication system configured for resource management for UEs under coverage enhancement in accordance with various aspects of the present disclosure.

FIG. 2 illustrates an example of a wireless communication system 200 for resource management for UEs under coverage enhancement in accordance with various aspects of the present disclosure. The system 200 may include a base station 105-a having a coverage area 110-a, communicating with UEs 115 via communication links 125. Each of these may be examples of the corresponding devices and aspects of the system 100 described with reference to FIG. 1. In some examples, the communication links 125 may include bundled transmissions, (e.g., TTI bundling).

The communication links 125 may include control and data channels 225, which may be control-based and/or control-less. Data channels may be divided into logical channels, transport channels, and physical layer channels. DL physical channels may include physical broadcast channel (PBCH), physical control format indicator channel (PCFICH), physical downlink control channel (PDCCH), physical HARQ indicator channel (PHICH), physical downlink shared channel (PDSCH) and physical multicast channel (PMCH). The uplink physical channels may include physical random access channel (PRACH), physical uplink control channel (PUCCH), and physical uplink shared channel (PUSCH).

PDCCH carries downlink control information (DCI) in control channel elements (CCEs), which may consist of logically contiguous resource element groups (REGs), where each REG contains 4 resource elements (REs). DCI includes information regarding DL scheduling assignments, UL resource grants, transmission scheme, UL power control, hybrid automatic repeat request (HARM) information, modulation and coding scheme (MCS) and other information. The size and format of the DCI messages can differ depending on the type and amount of information that is carried by the DCI.

To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The grouping of CCEs may be referred to as an aggregation level. Different search spaces may have the same or different aggregation levels. In some cases, two search spaces have the same aggregation level in a subframe. In other cases, two search spaces may have different aggregation levels in a subframe. The search space can be partitioned into two regions: a common CCE region or search space and a UE-specific (dedicated) CCE region or search space. The common CCE region may be monitored by all UEs served by a base station 105 and may include information such as paging information, system information, random access procedures and the like. The UE-specific search space may include user-specific control information. CCEs may be indexed, and the common search space always starts from CCE 0. A UE 115 may attempt to decode DCI by performing a process known as a blind decode, during which search spaces are randomly decoded until the DCI is detected. During a blind decode, the user equipment may attempt descramble all potential DCI messages using its cell radio network temporary identifier (C-RNTI), and perform a cyclic redundancy check (CRC) to determine whether the attempt was successful. As described more fully below with reference to FIG. 12, a UE 115 may also attempt blind decode certain data channels (e.g., PBCH and/or PDSCH) by reference to a UE-specific search space designated for control-less data.

In the system 200, the UE 115-a may be a low-complexity UE 115 with a reduced peak data rate. For example, the UE 115-a may be a meter or sensor with a data rate of 100 kbps or less. It may thus be possible for the UE 115-a to operate via a narrowband width, which may help costs of developing, implementing, and communicating with the UE 115-a. To support such narrowband operation, it may be possible to set aside some narrow bandwidth (e.g., 1.25 MHz) to support the low-complexity UE 115 operation within the system 200. Alternatively, low-complexity UEs 115 may be operated in a larger bandwidth, and may thus co-exist with regular UEs 115, such as UE 115-b, which may be a smartphone or a tablet, in various examples.

The system 200 may be configured to support operation of low-complexity UEs 115 at a larger bandwidth in a variety of ways. For instance, a low-complexity UE 115-a—e.g., a wireless communication device within a parking meter—may operate with at that same large bandwidth as a regular UE 115-b—e.g., a smartphone. In some cases, all UEs 115 within the system 200 may operate at bandwidths up to 20 MHz, but this may not be helpful in reducing cost or complexity (e.g., battery consumption) of the UE 115-a. Alternatively, low-complexity UEs 115 may operate with smaller portions of system 200 bandwidth.

Figure 3A:
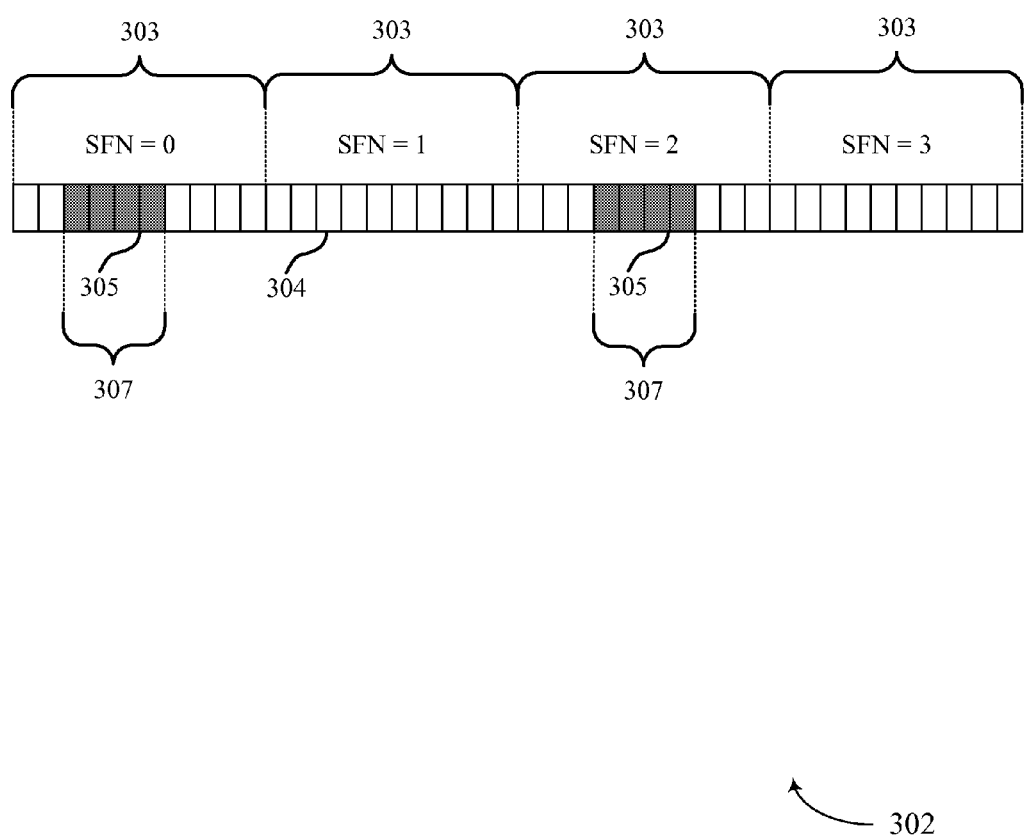
FIGS. 3A-3D illustrate examples of resource management for UEs under coverage enhancement in accordance with various aspects of the present disclosure.

Some solutions to support low-complexity UE 115 operation within the system 200 bandwidth incorporate TTI bundling, which may be configured on a per-UE basis. Bundling operations may, in some instances, be configured by dedicated signaling from higher layers (e.g., with a ttiBundling parameter). FIG. 3A illustrates an example of resource management, utilizing TTI bundling, for UEs under coverage enhancement in accordance with various aspects of the present disclosure. FIG. 3A shows an example of a frame structure 302 of a carrier within the systems 100 or 200 described with reference to FIGS. 1 and 2. For instance, FIG. 3A may illustrate a frame structure of a wireless carrier utilized for a communication link 125 in systems 100 or 200.

Frame structures for frequency division duplex (FDD) (e.g., frame structure type 1) and time division duplex (TDD) (e.g., frame structure type 2) may be defined within the systems 100 and 200. Time intervals may be expressed in multiples of a basic time unit (Ts=1/30,720,000 seconds). Each frame structure may have a radio frame length (Tf=307200·Ts=10 ms) and may include two half-frames of 5 ms (153600·Ts) each. Each half-frame may include five subframes of 1 ms (30720·Ts). For TDD frame structures, each subframe may carry UL or DL traffic, and special subframes may be used to switch between DL and UL transmission. Subframes may be bundled as described below, and the communication links 125 may include TTI-bundled transmission.

The frame structure 302 may thus include a number of frames 303, each composed of ten (10) subframes 304. In some examples, the frame structure 302 illustrates an LTE carrier, which may be of frame structure type 1 or type 2, where each subframe is 1 ms in duration. In the example frame structure 302, system frame numbers (SFN) 0 through 3 are illustrated; but those skilled in the art will recognize the general applicability this discussion to other portions of a frame structure and to other frames and subframes within a system.

Subframes within a frame may be bundled 305. Bundling may include transmitting redundant signals (e.g., redundant bits) within consecutive subframes. The number of TTIs bundled—e.g., the number of TTIs, which may be consecutive or non-consecutive, carrying redundant bits—may be referred to as a TTI bundle length 307. A TTI bundle length 307 for a bundle having four (4) redundant transmissions may be 4 ms, and may be referred to as having a length or size of four (4) TTIs or four (4) subframes.

By way of example, if TTI bundling is configured for a UE 115, a bundling operation may apply to a certain channel or channels. For instance, bundling may be restricted to an uplink shared channel, and it may not be applied to other channels. In other examples, however, bundling operations may be applied to multiple channels within a subframe.

In some examples, bundling may be fixed and/or restricted to a maximum bundling length 307. Bundling may, for instance, be restricted to four (4) consecutive subframes. A certain channel (e.g., PUSCH) may therefore, in some examples, be transmitted in four (4) consecutive TTIs, but not more or fewer. Additionally or alternatively, the same hybrid automatic-repeat request (HARQ) process number may be used in each of the bundled subframes. A TTI bundle 305 may be treated as single resource—e.g., a single grant and a single HARQ acknowledgement may be used for each bundle. While the bundling length 307 depicted in FIG. 3A is four (4), the bundling length 307 may be substantially any number. For example, the bundling length 307 may include any number of subframes within a radio frame structure (e.g., within an LTE radio frame structure). The bundling length 307 may include subframes 304 spanning several frames 303.

For certain bundling operations, a resource allocation size may be restricted to a number of resource blocks (e.g., three resource blocks); but in other instances, no such restriction may be imposed by a system. Additionally or alternatively, a system may set a modulation order related to bundling—e.g., a modulation order may be set to two (2), which may indicate quadrature phase-shift keying (QPSK).

While bundling may be employed for a variety of reasons, it may offer particular benefits for low data-rate traffic. For example, a voice over internet protocol (VoIP) packet may be difficult to transmit in a single TTI due to low uplink link budget. Layer 2 (L2) segmentation may thus be applied, such that the VoIP packet may be transmitted in several TTIs. For instance, a VoIP packet could be segmented into four (4) radio link control (RLC) protocol data units (PDUs), which may be transmitted in four (4) consecutive TTIs. In such cases, two (2) or three (3) HARQ retransmissions may be targeted to achieve sufficient coverage. This approach may, however, present several drawbacks.

For instance, each additional L2 segment introduces additional overhead—a one (1) byte RLC, one (1) byte media access control (MAC), and three (3) bytes Layer 3 (L3) cyclic redundancy check (CRC) overhead. Thus, 15% overhead may be added, assuming a 33 byte RLC service data unit (SDU). Accordingly, for four (4) segments of a VoIP packet, there may be additional L1/L2 overhead of 45%. Moreover, HARQ transmissions/retransmissions for each segment may require grants on physical downlink control channel (PDCCH), which may consume significant PDCCH resources.

Additionally, each HARQ transmission or retransmission is followed by HARQ feedback on physical HARQ on PHICH. Assuming a negative acknowledgement (NACK) to acknowledgement (ACK) error ratio of $10^{-3}$, the large number of HARQ feedback signals may lead to high packet loss probabilities. For example, if twelve (12) HARQ feedback signals are sent, the HARQ feedback error ratio might be on the order of $1.2 \times 10^{-2}$; but packet loss rates of more than $10^{-2}$ may be unacceptable for VoIP traffic.

In view of these issues, TTI bundling, which allows for a single uplink grant and a single PHICH signal per TTI bundle 305 may be advantageous. Furthermore, L1/L2 overhead may be minimized because L2 segmentation may be avoided.

Additionally, TTI bundling may allow for significant coverage enhancement of UEs 115. A large TTI bundling length 307 may help provide large coverage enhancements. For instance, TTI bundling on the order of 100 subframes may help provide large uplink coverage enhancement (e.g., on the order of 20 dB), and possibly for downlink coverage enhancement as well.

Despite these benefits, however, large TTI bundling may introduce additional issues for devices within the systems 100 and 200. For large TTI bundling, control-based data transmissions for low complexity UEs 115 may be inefficient. For example, a 100-subframe control transmission scheduling a 100-subframe PDSCH transmission may introduce an inefficiency in overhead. Such inefficiencies may be underscored if a payload size for a PDSCH is small—e.g., with respect to PDCCH or EPDCCH. For instance, a PDCCH or EPDCCH size of approximately 40 bits scheduling a PDSCH of less than 100 bits may result in an inefficient use of resources because of the relatively significant power used to receive and decode such transmissions when bundled. Further, in some coverage enhancement scenarios, a PDSCH transport block may be anticipated to be small. For example, PDSCH (or PUSCH) size may range from tens to hundreds of bits for some MTC UEs 115.

In such cases, it may be beneficial to recognize various coverage enhancement techniques and/or channel associations and to operate devices within the system accordingly. Utilizing different encoding schemes and/or employing combinations of control-based and control-less transmission may decrease or avoid inefficiencies and may allow for lower UE complexity implantation.

In some examples of the system 100 and 200, a base station 105 and/or a UE 115 employs threshold-dependent PDSCH or PUSCH encoding. A device may, for example, identify a transmission TTI bundling length 307 associated with a shared channel—e.g., a PDSCH or PUSCH. In other words, the device may identify a number of subframes, consecutive or non-consecutive, with redundant versions of a PDSCH or PUSCH. The device may determine an encoding scheme for the shared channel based, wholly or partially, on the identified TTI bundling length 307.

Large TTI bundling lengths 307 may be difficult and/or costly to decode if they encoded utilizing a turbo-coding scheme. For instance, multiple-hypotheses decoding for large TTI bundled PDSCH can be expensive, both in time and power resources. Upon identifying a TTI bundling length 307, a device (e.g., at an eNB 105 or a UE 115) may determine an encoding scheme by selecting a turbo coding scheme when the TTI bundling length 307 is less than or equal to a threshold, and by selecting a convolutional coding scheme when the TTI bundling length 307 is greater than a threshold. For example, for a TTI bundle size 307 of 10 or less, PDSCH or PUSCH may be encoded with a turbo-coding; otherwise, PDSCH or PUSCH may be encoded with a convolutional coding scheme.

Figure 3B:
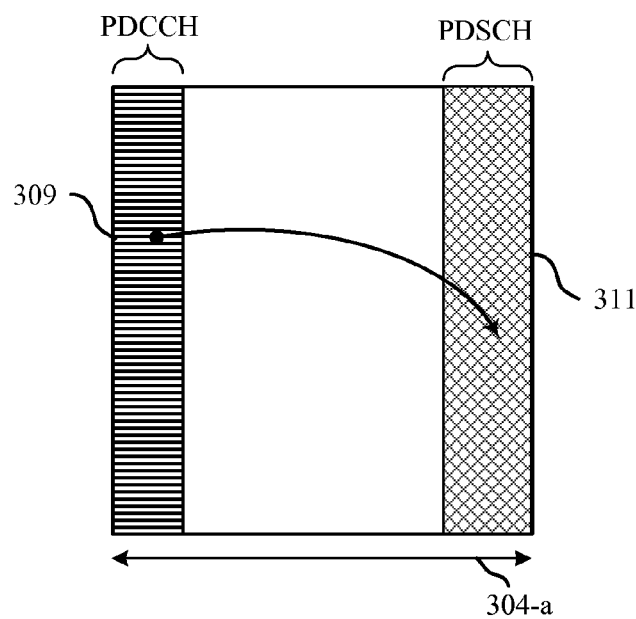
Figure 3C:
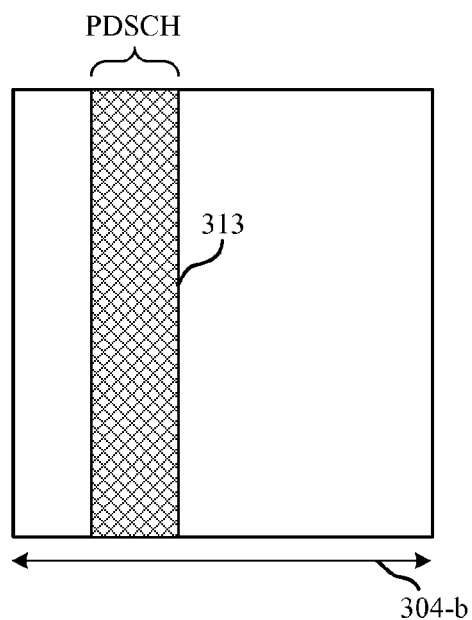

Additionally or alternatively, an encoding scheme may be determined based on other factors. FIGS. 3B and 3C illustrate examples of resource management, utilizing control channel association, for UEs under coverage enhancement in accordance with various aspects of the present disclosure. FIGS. 3B and 3C show example TTIs 306 and 308 of a frame of a carrier within the systems 100 or 200. The TTIs 306 and 308 may be subframes 304, which may be examples of the subframes 304 of FIG. 3A.

The TTI 306 may include several channels, which may be in distinct regions of the TTI 306. The TTI 306 may, for instance, include PDCCH (or EPDCCH) 309 and PDSCH 311. In some examples, PDCCH (or EPDCCH) 309 is associated with PDSCH 311. For instance, PDCCH (or EPDCCH) 309 may schedule resources of PDSCH 311. The TTI 308 may include several channels, including PDSCH 313, which may be unassociated with a control channel. PDSCH 313 may, for instance, not be scheduled by a PDCCH (or an EPDCCH) within the TTI 308.

In some examples, a base station 105 and/or a UE 115 employs threshold-dependent encoding. A device may thus determine an association between the shared channel and a control channel. For instance, a device receiving TTI 306 may determine an associate between PDSCH 311 and PDCCH (or EPDCCH) 309, while a device receiving TTI 308 may determine that no control association exists for PDSCH 313. Determining an association between a shared channel and a control channel may thus include recognizing that an association exists between the shared channel and the control channel, or recognizing that no association exists between the shared channel an the control channel.

An encoding scheme for a shared channel may then be determined based on the determined association between the shared channel and the control channel. Determining the encoding scheme for the shared channel may include selecting a turbo coding scheme upon recognizing that an association exists between the control channel and the shared channel, or selecting a convolutional coding scheme upon recognizing that no associate exists between the control channel and the shared channel. In some cases, both the determination of TTI bundling length, as discussed above, and the determination of the association, or lack of, between the control channel and shared channel, may be utilized to determine an encoding scheme.

Figure 3D:
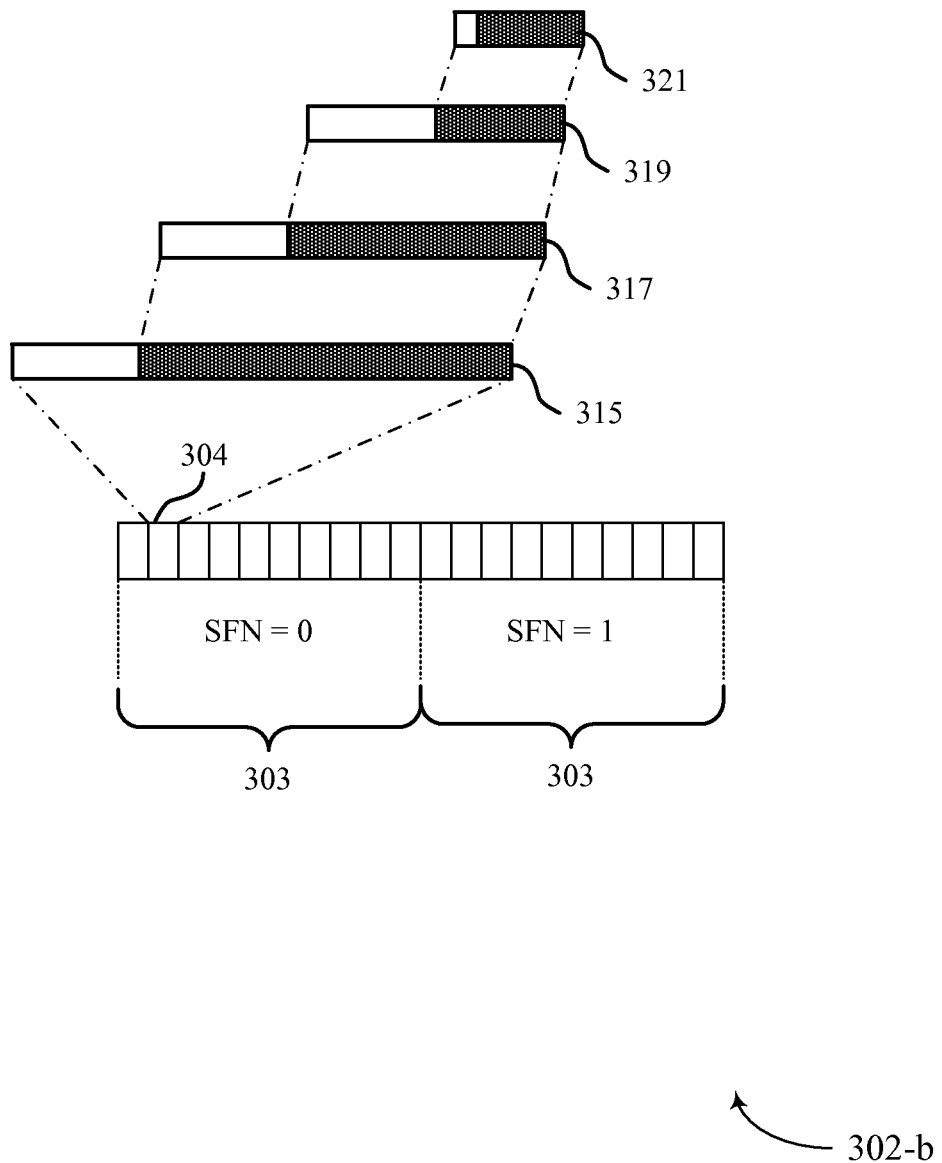

In still further examples, transmission block size (TBS) is an additional or alternative factor for threshold-dependent encoding. FIG. 3D illustrates an example of resource management, utilizing TBS, for UEs under coverage enhancement in accordance with various aspects of the present disclosure. FIG. 3D shows an example of frame structure 302-*a* of a carrier within the systems 100 or 200 described with reference to FIGS. 1 and 2. FIG. 3D, like FIG. 3A, may illustrate a frame structure of a wireless carrier utilized for a communication link 125 in systems 100 or 200. The frame structure 302-*a* may be an example of the frame structure 302 described above with reference to FIG. 3A.

The subframe 304 may include a transport block 315 including a MAC header. The payload of the transport block 315 may include a RLC PDU 317 including an RLC header. The RLC PDU 317 payload may include a packet data convergence protocol (PDCP) PDU 319 including a PDCP header. And the PDCP PDU 319 payload may include an IP packet 321 including an IP header. In some examples, the RLC PDU 317 and/or the transport block 315 includes padding in addition to the payload and header. The TBS may thus vary according to the size of the transport block 315 payload, which may vary according to the size of concatenated or segmented PDUs from other layers. The transport block 315 may be a transport block 315 of a shared channel (e.g., PDSCH or PUSCH).

In some examples, the TBS is small—on the order of 100 or fewer bits—such as for communications with some MTC UEs 115. In other cases, the TBS is quite large. Threshold-dependent encoding may be based, to some degree, on TBS. For instance, a device (e.g., eNB 105 or UE 115) may identify a TBS of the shared channel. The identified TBS may be utilized to determine an encoding scheme. If, for example, the TBS is 100 bits or fewer, convolutional coding may be utilized for PDSCH or PUSCH; otherwise, turbo-coding may be utilized for PDSCH or PUSCH. TBS may be used as a factor to determine an encoding scheme in addition to TTI bundling length and/or control channel associate discussed above.

Threshold-dependent encoding may, additionally or alternatively, depend on other factors. For example, the threshold may be in the form of an amount of resources associated with a transmission. If a transmission is assigned with one (1) or two (2) resource blocks (RBs), convolutional encoding may be determined; if a transmission is assigned with three (3) or more RBs, turbo encoding may be determined. In other examples, the threshold may be in the form of a modulation and coding scheme (MCS) or index. If a transmission is associated with QPSK, convolutional encoding may be determined; if a transmission is associated with quadrature amplitude modulation (QAM)—e.g., 16QAM or higher, turbo encoding may be determined.

Additionally, threshold-dependent encoding selection may be combined with other physical layer parameters. For instance, if a convolutional encoding scheme is determined, QPSK modulation may always be assumed; if a turbo encoding scheme is determined, the modulation scheme may be determined based on a signaling, which may be QPSK, 16QAM, 64QAM, or the like.

Various devices may have a threshold-dependent encoding selection mode enabled or disabled. For example, whether a UE 115 or base station 105 employs a threshold-dependent encoding scheme may be based on whether an encoding scheme selection mode is enabled for the UE 115 or base station 105. Such enabling may be by way of higher layer signaling. Devices (e.g., eNB 105 or UE 115) may also utilize a decoding scheme based on a determined encoding scheme. In other words, a device may employ various decoding methods based on determining how the received signal was encoded, and without additional signaling indicating how a signal may have been encoded Those skilled in the art will recognize that turbo-coding and convolutional coding discussed herein are simply example encoding techniques that may be implemented for error correction. Other encoding schemes may be utilized as well. For instance, a low-density parity-check (LDPC) may be employed based on a different or additional threshold TTI bundling length.

Figure 4:
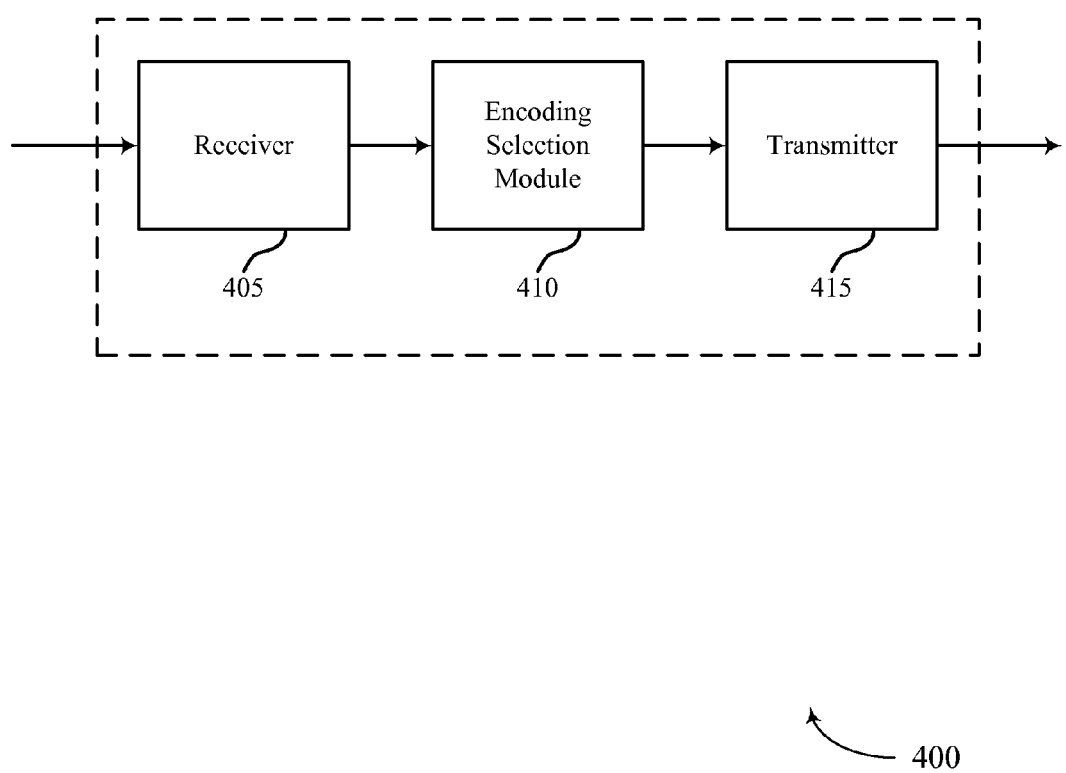
FIG. 4 shows a block diagram of a device configured for resource management for UEs under coverage enhancement in accordance with various aspects of the present disclosure.

Turning next to FIG. 4, shown is a block diagram of a device 400 configured for resource management for UEs under coverage enhancement in accordance with various aspects of the present disclosure. The device 400 may be an example of one or more aspects of a base station 105 and/or UE 115 described with reference to FIGS. 1-3. The device 400 may include a receiver 405, a encoding selection module 410, and/or a transmitter 415. The device 400 may also include a processor. Each of these components may be in communication with one another.

The receiver 405 may be configured to receive information such as packets, user data, and/or control information associated with various information channels (e.g., control channels, data channels, etc.), which may be bundled as described above. Information may be passed on to the encoding selection module 410, and to other components of the device 400.

The encoding selection module 410 may be configured to identify a TTI bundling length associated with a shared channel. Additionally or alternatively, the encoding selection module 410 may be configured to determine an association between the shared channel and a control channel. And the encoding selection module 410 may be configured to determine an encoding scheme for the shared channel based on the identified TTI bundling length of the shared channel, the determined association between the shared channel and the control channel, or both.

The transmitter 415 may transmit the one or more signals received from other components of the device 400. In some embodiments, the transmitter 415 may be collocated with the receiver 405 in a transceiver module. The transmitter 415 may include a single antenna, or it may include a plurality of antennas.

Figure 5:
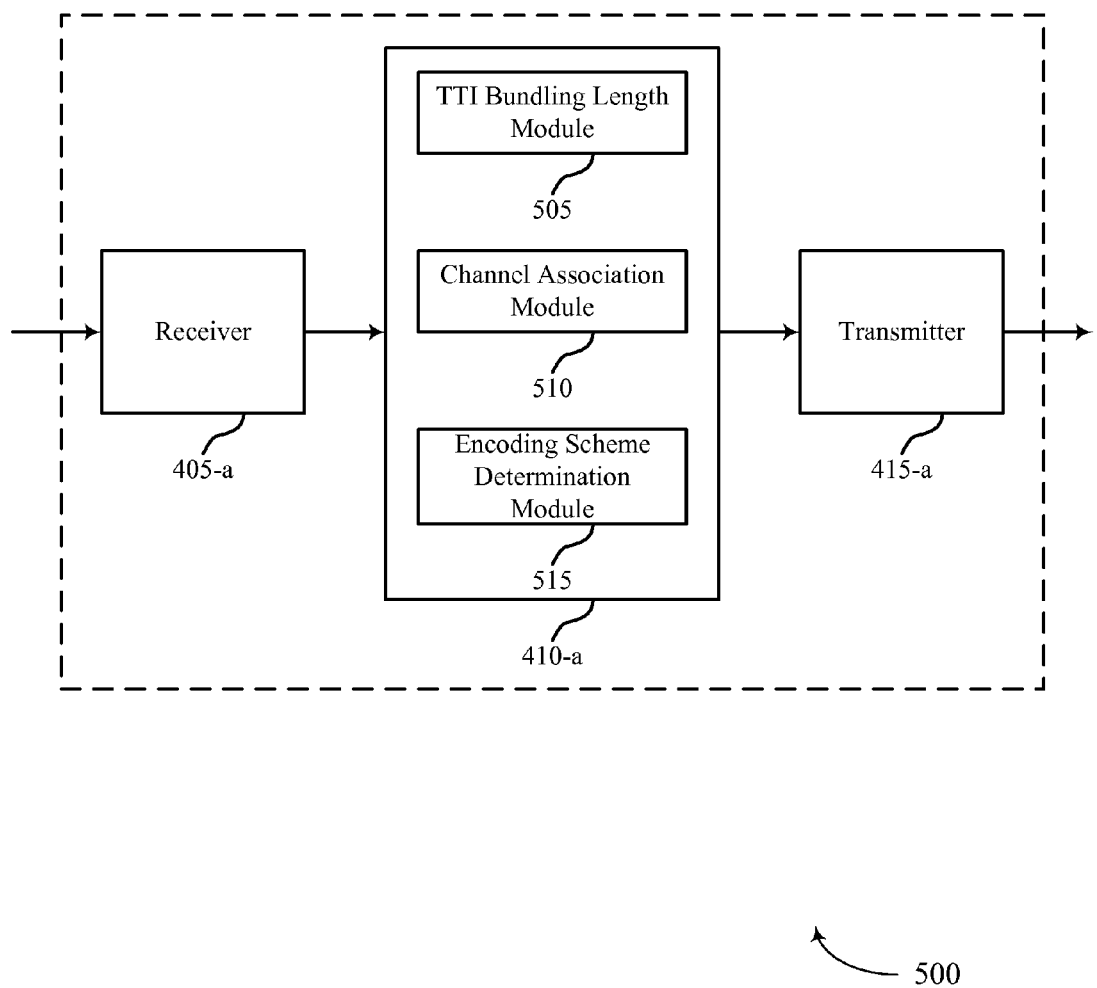
FIG. 5 shows a block diagram of a device configured for resource management for UEs under coverage enhancement in accordance with various aspects of the present disclosure.

FIG. 5 shows a block diagram of a device 500 configured for resource management for UEs under coverage enhancement in accordance with various aspects of the present disclosure. The device 500 may be an example of one or more aspects of the device 400, a base station 105, and/or a UE 115 described with reference to FIGS. 1-4. The device 400 may include a receiver 415-*a*, a encoding selection module 410-*a*, and/or a transmitter 415-*a*. The device 500 may also include a processor. Each of these components may be in communication with each other. The encoding selection module 410-*a* may also include a TTI bundling length module 505, a channel association module 510, and an encoding scheme determination module 515.

The receiver 415-*a* may receive information which may be passed on to the encoding selection module 410-*a*, and to other components of the device 500. The encoding selection module 410-*a* may be configured to perform the operations of the encoding selection module 410 described above with reference to FIG. 4. The transmitter 415-*a* may transmit the one or more signals received from other components of the device 500

The TTI bundling length module 505 may be configured to identify a TTI bundling length associated with a shared channel as described above with reference to FIG. 3A. The TTI bundling length module 505 may, for instance, identify a TTI bundling length of a signal received by receiver 415-*a*.

The channel association module 510 may be configured to determine an association between the shared channel and a control channel as described above with reference to FIGS. 3B and 3C. In some examples, recognizing the association between the shared channel and a control channel comprises recognizing that an association exists between the shared channel and the control channel or recognizing that no association exists between the shared channel and the control channel.

The encoding scheme determination module 515 may be configured to determine an encoding scheme for the shared channel based on the identified TTI bundling length of the shared channel, the determined association between the shared channel and the control channel, or a TBS, as described above with reference to FIGS. 3A-3D. The encoding scheme determination module 515 may also be configured to enable an encoding selection mode, such that determining the encoding scheme is based at least in part on the enabled encoding selection mode as described above with reference to FIGS. 3A-3D. In some examples, the encoding scheme selection mode may be enabled by dedicate signaling received by the receiver 415-*a* and communicated to the encoding selection module 410-*a*.

Figure 6:
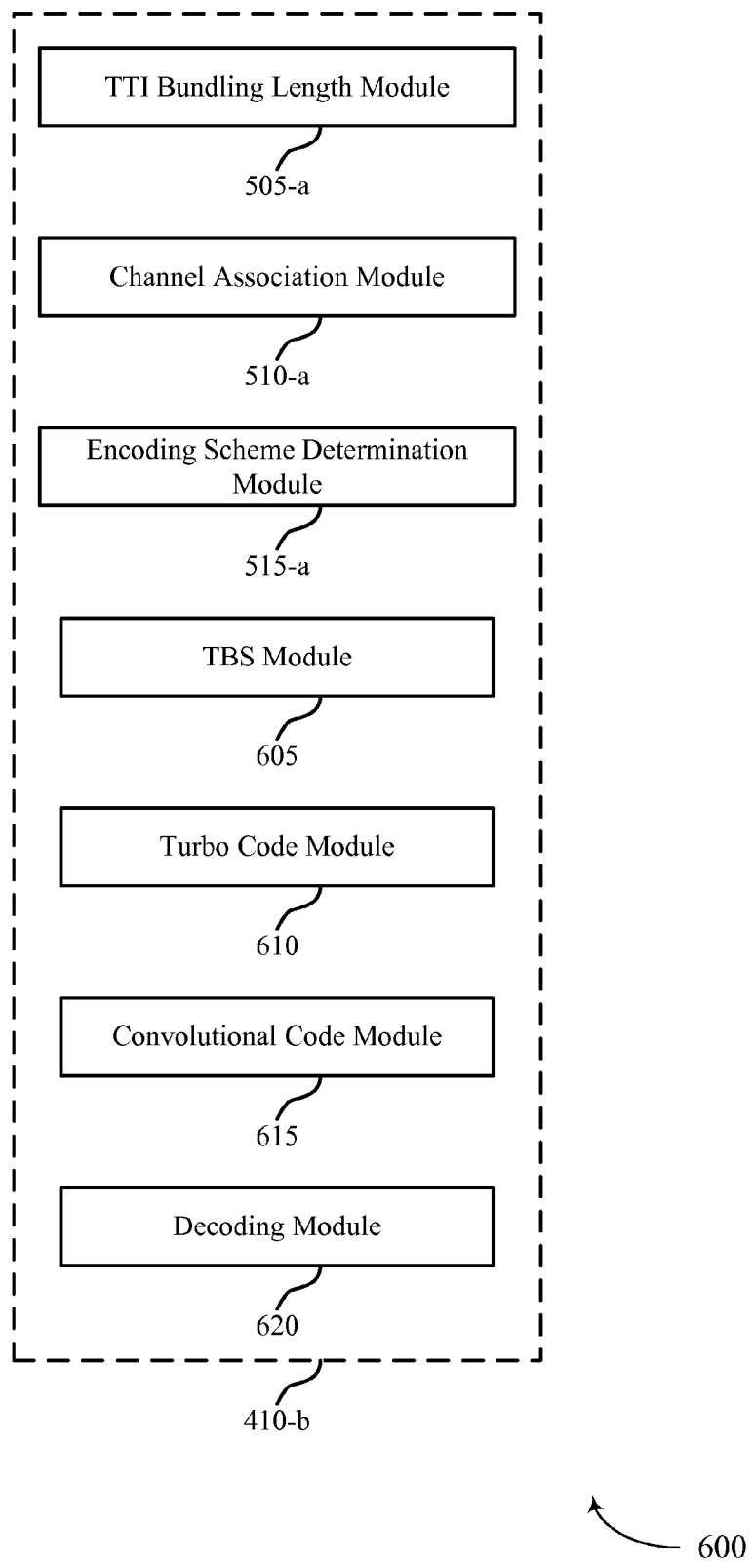
FIG. 6 shows a block diagram of a device configured for resource management for UEs under coverage enhancement in accordance with various aspects of the present disclosure.

FIG. 6 shows a block diagram 600 of a encoding selection module 410-*b* configured for resource management for UEs under coverage enhancement in accordance with various aspects of the present disclosure. The encoding selection module 410-*b* may be an example of one or more aspects of an encoding selection module 410 described with reference to FIGS. 4 and 5. The encoding selection module 410-*b* may include a TTI bundling length module 505-*a*, a channel association module 510-*a*, and an encoding scheme determination module 515-*a*. Each of these modules may perform the functions described above with reference to FIG. 5. The encoding selection module 410-*b* may also include a TBS module 605, a turbo code module 610, a convolutional code module 615, and a decoding module 620.

The TBS module 605 may be configured to identify a TBS of the shared channel, such that determining the encoding scheme may be based on the identified TBS as described above with reference to FIG. 3D.

The turbo code module 610 may be configured to select a turbo-coding scheme when the TTI bundling length is less than or equal to a threshold as described above with reference to FIG. 3A. Additionally or alternatively, the turbo code module 610 may be configured to select a turbo-coding scheme upon recognizing that an association exists between the control channel and the shared channel as described above with reference to FIGS. 3B and 3C.

The convolutional code module 615 may be configured to select a convolutional-coding scheme when the TTI bundling length is greater than the threshold as described above with reference to FIG. 3A. Additionally or alternatively, the convolutional code module 615 may be configured to select a convolutional coding scheme upon recognizing that no association exists between the control channel and the shared channel as described above with reference to FIGS. 3B and 3C.

In some examples, the decoding module 620 may be configured to utilize a decoding scheme based on the determined encoding scheme as described above with reference to FIG. 3A-3D.

Figure 7:
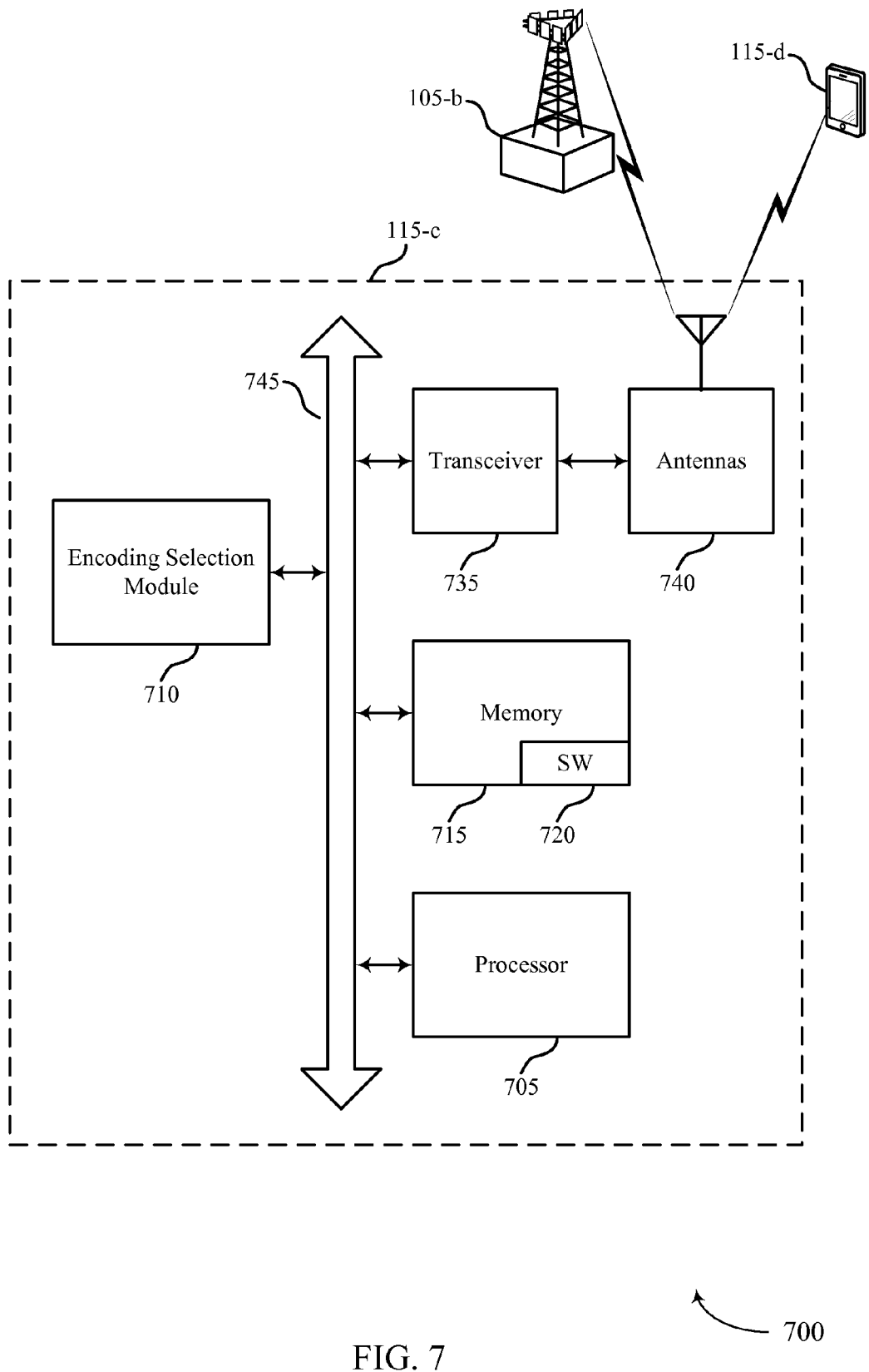
FIG. 7 shows a block diagram of a system configured for resource management for UEs under coverage enhancement in accordance with various aspects of the present disclosure.

The components of the devices 400, 410-*b*, and 500 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors FIG. 7 shows a diagram of a system 700 configured for resource management for UEs under coverage enhancement in accordance with various aspects of the present disclosure. System 700 may include a UE 115-*c*, which may be an example of the UEs 115 or the devices 400 and 500 described with reference to FIGS. 1-6. The UE 115-*c* may include a encoding selection module 710, which may be an example of an encoding selection module 410 described with reference to FIGS. 4-6. In some examples, the UE 115-*c* is a low-complexity UE 115, such as an MTC device. In other cases, the UE 115-*c* includes components for bi-directional voice and data communications including components for transmitting communications and components for receiving communications.

The UE 115-*c* may include a processor module 705, memory 715 (including software (SW) 720), a transceiver module 735, and one or more antenna(s) 740, which each may communicate, directly or indirectly, with one another (e.g., via one or more buses 745). The transceiver module 735 may be configured to communicate bi-directionally, via the antenna(s) 740 and/or one or more wired or wireless links, with one or more networks, as described above. For example, the transceiver module 735 may be configured to communicate bi-directionally with base station 105-*b*. The transceiver module 735 may include a modem configured to modulate the packets and provide the modulated packets to the antenna(s) 740 for transmission, and to demodulate packets received from the antenna(s) 740. While the UE 115-*c* may include a single antenna 740, the UE 115-*c* may also have multiple antennas 740 capable of concurrently transmitting and/or receiving multiple wireless transmissions. The transceiver module 735 may also be capable of concurrently communicating with one or more base stations 105 and/or UEs 115.

The memory 715 may include random access memory (RAM) and read only memory (ROM). The memory 715 may store computer-readable, computer-executable software/firmware code 720, including instructions that are configured to, when executed, cause the processor 705 to perform various functions described herein (e.g., identifying TTI bundling length, determining control-data channel association, determining TBS, determining encoding schemes, etc.). Alternatively, the software/firmware code 720 may not be directly executable by the processor 705 but may be configured to cause a computer (e.g., when compiled and executed) to perform functions described herein. The processor 705 may include an intelligent hardware device, e.g., a central processing unit (CPU), a microcontroller, an ASIC, etc. In some examples, the encoding selection module 710 may be a module of the processor 705.

Figure 8:
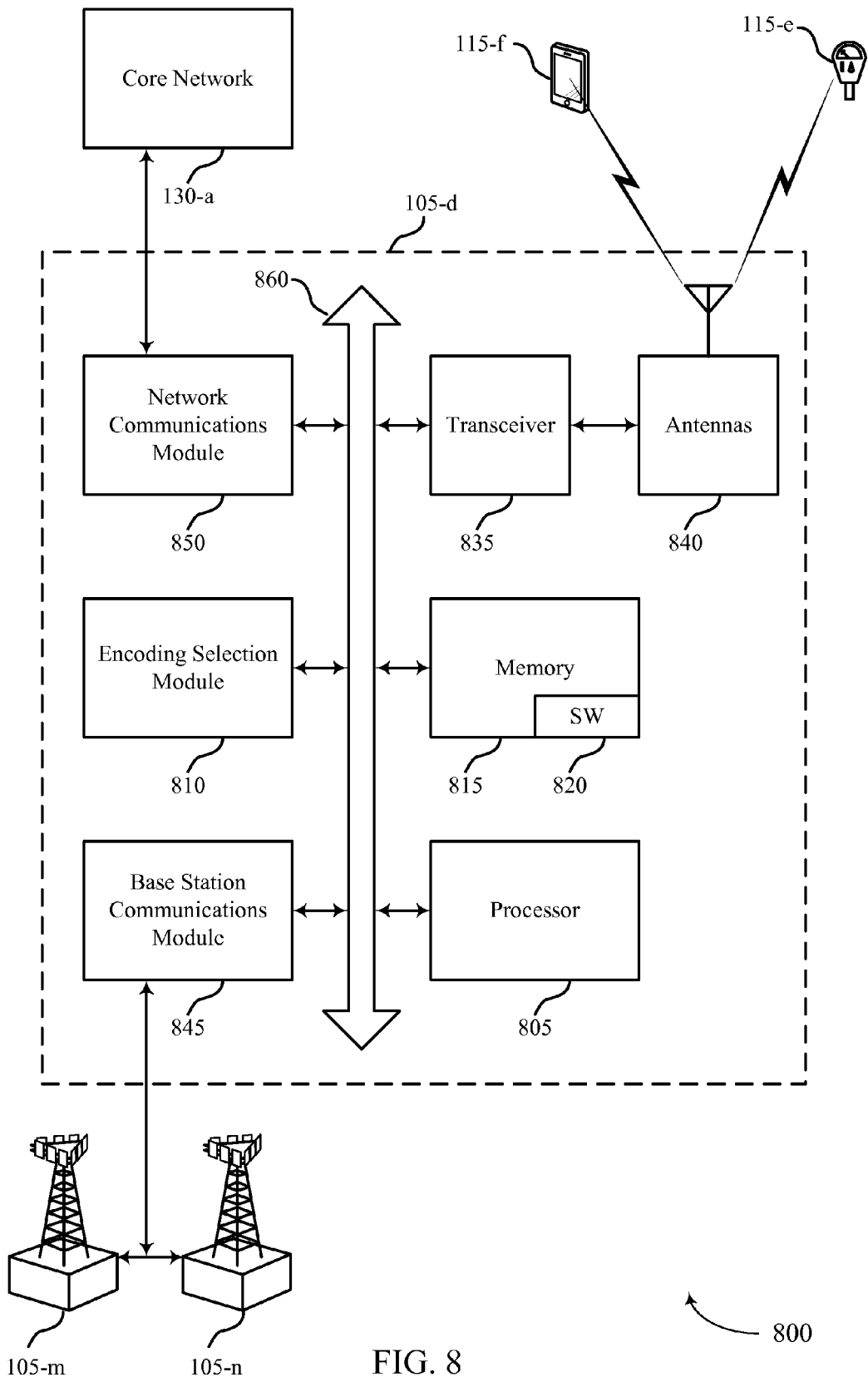
FIG. 8 shows a block diagram of a system configured for resource management for UEs under coverage enhancement in accordance with various aspects of the present disclosure.

FIG. 8 illustrates a block diagram of a system 800 configured for resource management for UEs under coverage enhancement in accordance with various aspects of the present disclosure. System 800 may include base stations 105, including base station 105-*d*, which may be an example of the base stations 105 and/or the devices 400 and 500, as described above with reference to FIGS. 1-6.

The base station 105-d may include a processor 805, an encoding selection module 810, memory 815 (including software (SW) 820), a transceiver 835, antennas 840, a base station communication module 845, and/or a network communication module 850, which each may be in communication, directly or indirectly, with one another (e.g., via one or more bus system 860). The encoding selection module 810 may be example of the encoding selection modules 410 described with reference to FIGS. 4-6.

The transceiver 835 may be configured to communicate bi-directionally, via the antenna(s) 840, with the UEs 115, which may be low-complexity UEs 115 (e.g., MTC devices), under coverage enhancement. The transceiver 835 (and/or other components of the base station 105-d) may also be configured to communicate bi-directionally, via the antennas 840, with one or more other base stations 105. The transceiver 830 may include a modem configured to modulate the packets and provide the modulated packets to the antennas 840 for transmission, and to demodulate packets received from the antennas 840. The base station 105-d may include multiple transceivers 830, each with one or more associated antennas 840. The transceiver may be an example of a combined receiver 405 and transmitter 415 of FIGS. 400 and 500.

The memory 815 may include random access memory (RAM) and read-only memory (ROM). The memory 815 may also store computer-readable, computer-executable software code 820 containing instructions that are configured to, when executed, cause the processor 805 to perform various functions described herein (e.g., identifying TTI bundling length, determining control-data channel association, determining TBS, determining encoding schemes, etc.). Alternatively, the software 820 may not be directly executable by the processor 805 but may be configured to cause the computer, e.g., when compiled and executed, to perform functions described herein.

The processor 805 may include an intelligent hardware device, e.g., a central processing unit (CPU), a microcontroller, an application-specific integrated circuit (ASIC), etc. The processor 805 may include various special purpose processors such as encoders, queue processing modules, base band processors, radio head controllers, digital signal processors (DSPs), and the like. In some examples, the encoding selection module 810 may be a module within the processor 805.

In some cases, the base station 105-d may have one or more wired backhaul links. The base station 105-d may have a wired backhaul link (e.g., S1 interface, etc.) to the core network 130-a. The base station 105-d may also communicate with other base stations 105, such as base station 105-m and base station 105-n via inter-base station communication links (e.g., X2 interface, etc.). Each of the base stations 105 may communicate with UEs 115 using the same or different wireless communications technologies. In some cases, base station 105-d may communicate with other base stations such as 105-m and/or 105-n utilizing base station communication module 845. In some embodiments, base station communication module 845 may provide an X2 interface within an LTE/LTE-A wireless communication network technology to provide communication between some of the base stations 105. In some cases, base station 105-d communicates with other base stations through core network 130-a. Additionally or alternatively, base station 105-d may communicate with the core network 130 through network communications module 850.

Figure 9:
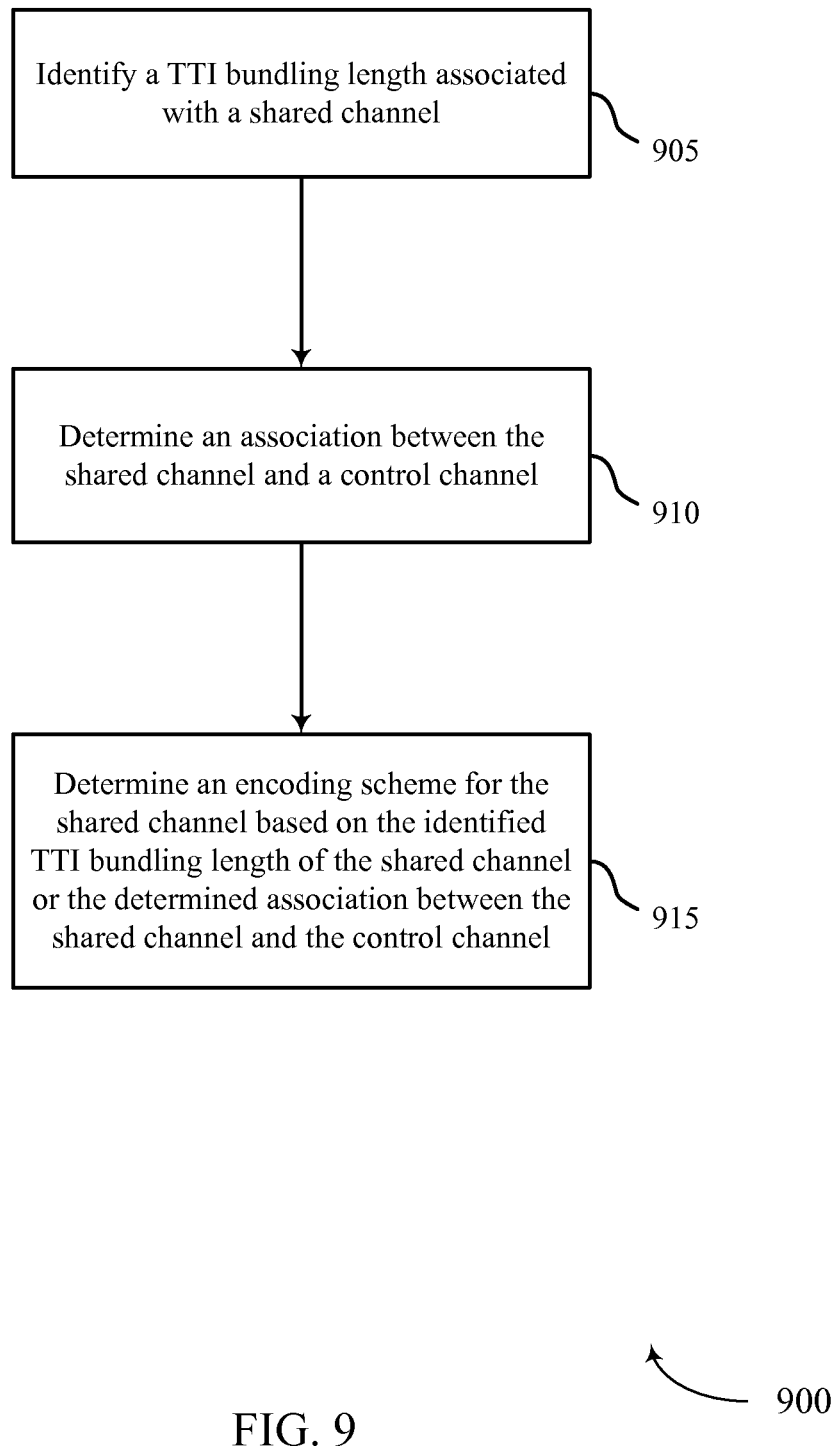
FIG. 9 shows a flowchart illustrating a method for resource management for UEs under coverage enhancement in accordance with various aspects of the present disclosure.

FIG. 9 shows a flowchart 900 illustrating a method for resource management for UEs under coverage enhancement in accordance with various aspects of the present disclosure. The functions of flowchart 900 may be implemented by a base station 105 or a UE 115, or one or more components, as described with reference to FIGS. 1-8. In certain examples, one or more of the blocks of the flowchart 900 may be performed by the encoding selection module as described with reference to FIGS. 4-8.

At block 905, the method may include identifying a TTI bundling length associated with a shared channel as described above with reference to FIG. 3A. In certain examples, the functions of block 905 may be performed by the TTI bundling length module 505 as described above with reference to FIG. 5.

At block 910, the method may include determining an association between the shared channel and a control channel as described above with reference to FIGS. 3B and 3C. In certain examples, the functions of block 910 may be performed by the channel association module 510 as described above with reference to FIG. 5.

At block 915, the method may include determining an encoding scheme for the shared channel based at least in part on the identified TTI bundling length of the shared channel or the determined association between the shared channel and the control channel as described above with reference to FIG. 3A-3D. In certain examples, the functions of block 915 may be performed by the encoding scheme determination module 515 as described above with reference to FIG. 5.

Figure 10:
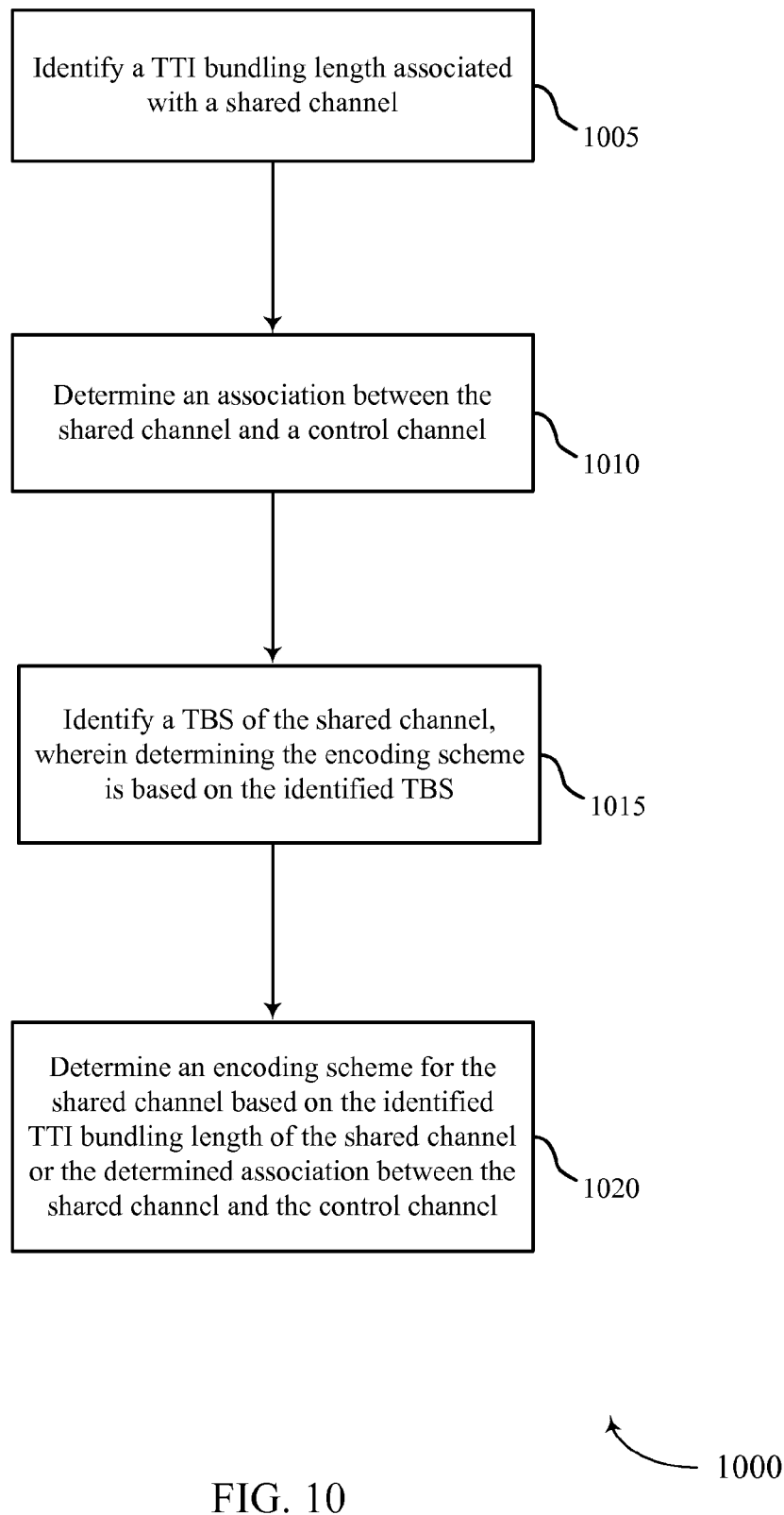
FIG. 10 shows a flowchart illustrating a method for resource management for UEs under coverage enhancement in accordance with various aspects of the present disclosure.

FIG. 10 shows a flowchart 1000 illustrating a method for resource management for UEs under coverage enhancement in accordance with various aspects of the present disclosure. The functions of flowchart 1000 may be implemented by a base station 105 and/or a UE 115, or one or more, components as described with reference to FIGS. 1-8. In certain examples, one or more of the operations of blocks of flowchart 1000 may be performed by the encoding selection module 410, 710, or 810 as described with reference to FIGS. 4-8. The method described in flowchart 1000 may also incorporate aspects of flowchart 900 of FIG. 9.

At block 1005, the method may include identifying a TTI bundling length associated with a shared channel as described above with reference to FIG. 3A. In certain examples, the functions of block 1005 may be performed by the TTI bundling length module 505 as described above with reference to FIG. 5.

At block 1010, the method may include determining an association between the shared channel and a control channel as described above with reference to FIGS. 3B and 3C. In certain examples, the functions of block 1010 may be performed by the channel association module 510 as described above with reference to FIG. 5.

At block 1015, the method may include identifying a TBS of the shared channel, where determining the encoding scheme may be based at least in part on the identified TBS, as described above with reference to FIG. 3D. In certain examples, the functions of block 1015 may be performed by the TBS module 605 as described above with reference to FIG. 6.

At block 1020, the method may include determining an encoding scheme for the shared channel based at least in part on the identified TTI bundling length of the shared channel or the determined association between the shared channel and the control channel, as described above with reference to FIG. 3A-3D. In certain examples, the functions of block 1020 may be performed by the encoding scheme determination module 515 as described above with reference to FIG. 5.

Figure 11:
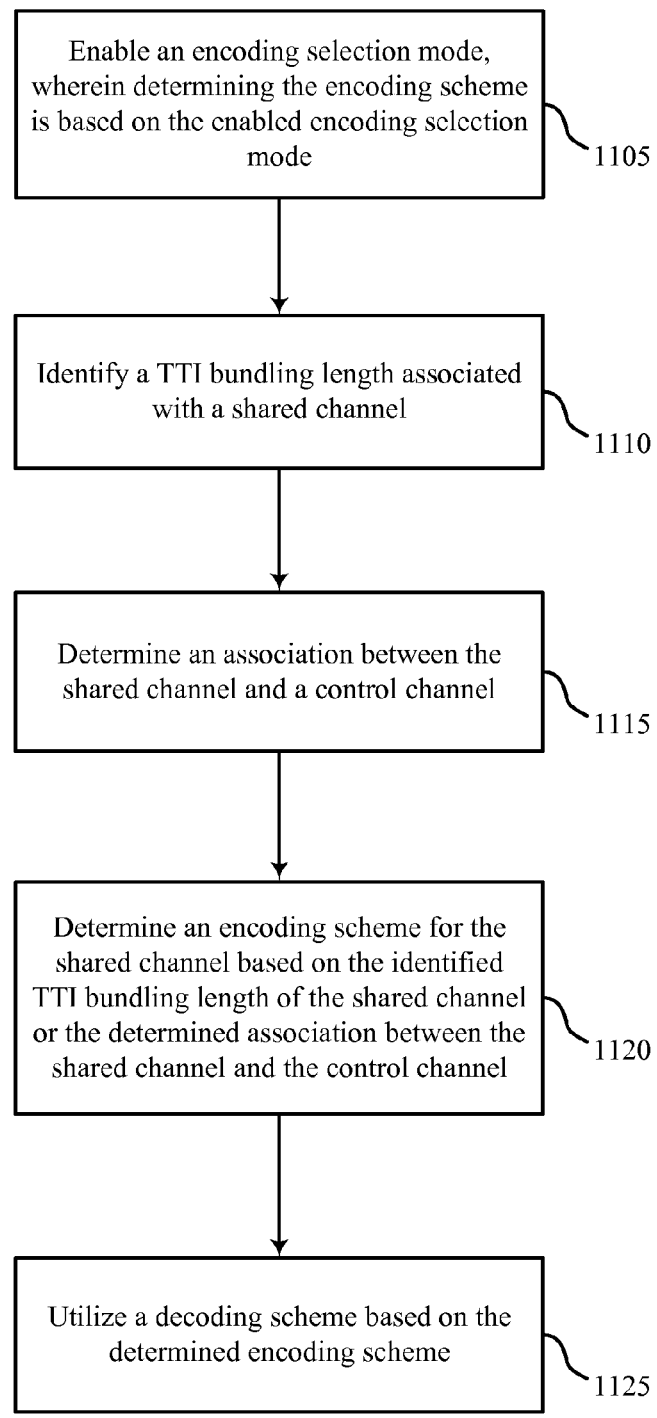
FIG. 11 shows a flowchart illustrating a method for resource management for UEs under coverage enhancement in accordance with various aspects of the present disclosure.

FIG. 11 shows a flowchart 1100 illustrating a method for resource management for UEs under coverage enhancement in accordance with various aspects of the present disclosure. The functions of flowchart 1100 may be implemented by a base station 105 and/or a UE 115, or one or more components, as described with reference to FIGS. 1-8. In certain examples, one or more of the blocks of the flowchart 1100 may be performed by the encoding selection module 410, 710, or 810, as described with reference to FIGS. 4-8. The method described in flowchart 1100 may also incorporate aspects of flowcharts 800 through 900 of FIGS. 8-9.

At block 1105, the both may enable an encoding selection mode, wherein determining the encoding scheme is based at least in part on the enabled encoding selection mode as described above with reference to FIG. 5. In certain examples, the functions of block 1105 may be performed by the encoding scheme determination module 515 as described above with reference to FIG. 5.

At block 1110, the method may include identifying a TTI bundling length associated with a shared channel as described above with reference to FIG. 3A. In certain examples, the functions of block 1105 may be performed by the TTI bundling length module 505 as described above with reference to FIG. 5.

At block 1115, the method may include determining an association between the shared channel and a control channel, as described above with reference to FIGS. 3B and 3C. In certain examples, the functions of block 1110 may be performed by the channel association module 510 as described above with reference to FIG. 5.

At block 1120, the method may involve determining an encoding scheme for the shared channel based at least in part on the identified TTI bundling length of the shared channel or the determined association between the shared channel and the control channel as described above with reference to FIGS. 3A-3D. In certain examples, the functions of block 1120 may be performed by the encoding scheme determination module 515 as described above with reference to FIG. 5.

At block 1125, the method may involve utilizing a decoding scheme based on the determined encoding scheme as described above with reference to FIGS. 3A-3D. In certain examples, the functions of block 1125 may be performed by the decoding module 620, as described above with reference to FIG. 6.

It should be noted that the methods described in flowcharts 900, 1000, and 1100 are just example implementations, and that the operations of the methods, and the steps therein, may be rearranged or otherwise modified such that other implementations are possible.

Figure 12:
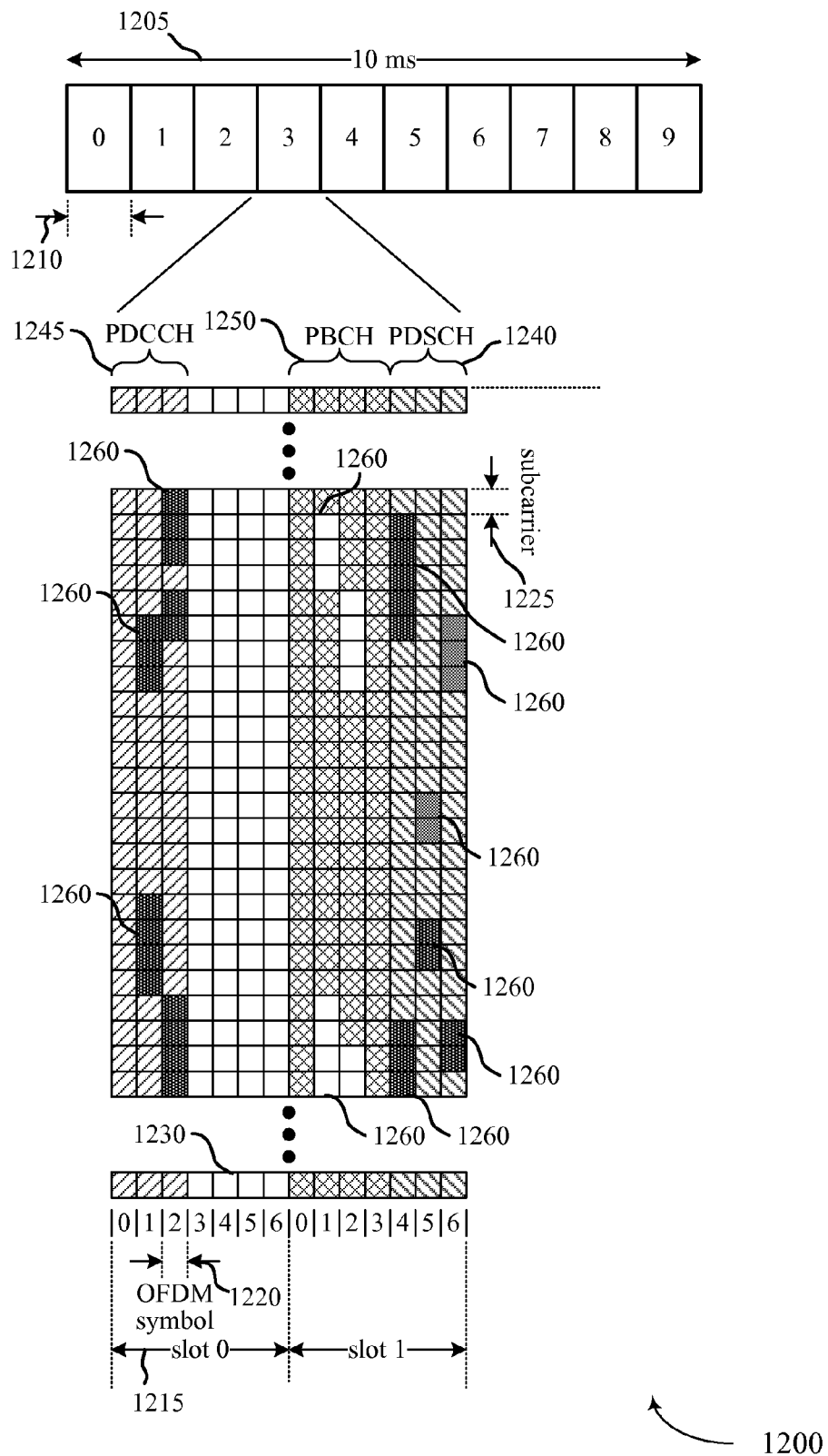
FIG. 12 illustrates an example of resource management for UEs under coverage enhancement in accordance with various aspects of the present disclosure.

Turning now to FIG. 12, shown is an example of resource management, utilizing control-based and control-less data monitoring, for UEs under coverage enhancement in accordance with various aspects of the present disclosure. FIG. 12 shows an example frame structure 1200 of a carrier within the system 100 or 200. As discussed above with reference to FIG. 3A, time resources for a carrier may be divided into 10 millisecond (ms) periods called frames 1205. A frame 1205 may be further divided into ten (10) 1 ms subframes 1210. A subframe 1210 may be further divided into two 0.5 ms slots 1215, and each slot 1215 may be divided into a number of symbol periods 1220. For example, a slot 1215 may be divided into 7 symbol periods 1220.

Frequency resources may be divided into subcarriers 1225. The spacing between adjacent subcarriers 1225 may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

One frequency subcarrier 1225 by one symbol period 1220 make a single resource element 1230, which may be modulated with a single modulation symbol. Modulation symbols may be waveforms containing a number of bits of data depending on a modulation and coding scheme (MCS). In some cases, a number of control channel elements (CCE) may be arranged into search spaces 1260, as discussed above with reference to FIG. 2, and may be used for sending information from one or more control channels and/or data channel. The carrier may have certain regions designated for transmitting certain channels, such as PDSCH 1240, PDCCH 1245, and/or PBCH 1250, and each channel may include common and/or UE-specific search spaces 1260 to facilitate control-based and control-less data channel monitoring.

In some examples, a UE 115 or a base station 105 (FIGS. 1 and 2) monitors both control-less and control-based data (e.g., PDSCH/PUSCH) transmissions simultaneously, or in different configurations. Two types of data channels (e.g., PDSCH/PUSCH) may be transmitted within a carrier. As discussed above, control-based data may be scheduled by an associated control channel, while control-less data may not be associated with a control channel, but may be blindly decoded. Accordingly, in a simultaneous monitoring scenario, a UE 115, for example, may monitor a search space 1260 within the PDCCH 1245 region and simultaneously monitor a search space 1260 within the PDSCH 1240 region. Additionally or alternatively, the UE 115 may monitor a search space 1260 within PBCH 1250 region.

By way of example, a UE 115 may monitor a first search 1260 space during a TTI 1210 for a control channel (e.g., PDCCH or EPDCCH), which may schedule a corresponding data channel. The UE 115 may monitor a second search space during the TTI 1210 for a data channel, which may be unassociated with any control channel. The UE 115 may then blind decode a control channel from the first search space 1260 and blind decode a data channel from the second search space 1260. The data channel may be encoded with a convolutional coding scheme, which may ease blind decoding. In some cases, the UE 115 may monitor several search spaces 1260 (e.g., candidates) for data transmissions; and, in some instances, the total number of blind decoding for all channels—control and data—may be kept within a certain limit. This control-less monitoring may allow a UE 115 (e.g., an MTC) to avoid overhead due to control-based monitoring, as discussed above.

Simultaneous control-less and control-based data monitoring may be configuration dependent. For example, a UE 115 may be enabled with an unassociated data monitoring mode for a UE, in which monitoring a search space 1260 for a control-less data channel may be enabled. In some examples, a UE 115 monitors control-based data—e.g., monitor a search space 1260 for PDCCH/EPDCCH—irrespective of whether control-less data is enabled. For example, a UE 115 may monitor a common search space 1260 for PDCCH. Control-based operation may thus always be enabled with respect to a common search space. Additionally or alternatively, control-based operation may always be enabled for broadcast traffic for certain UEs 115 (e.g., MTC UEs 115). Accordingly, a search space 1260 within the PBCH 1250 region may be monitored by certain UEs 115 irrespective of other control-less operations.

Figure 13:
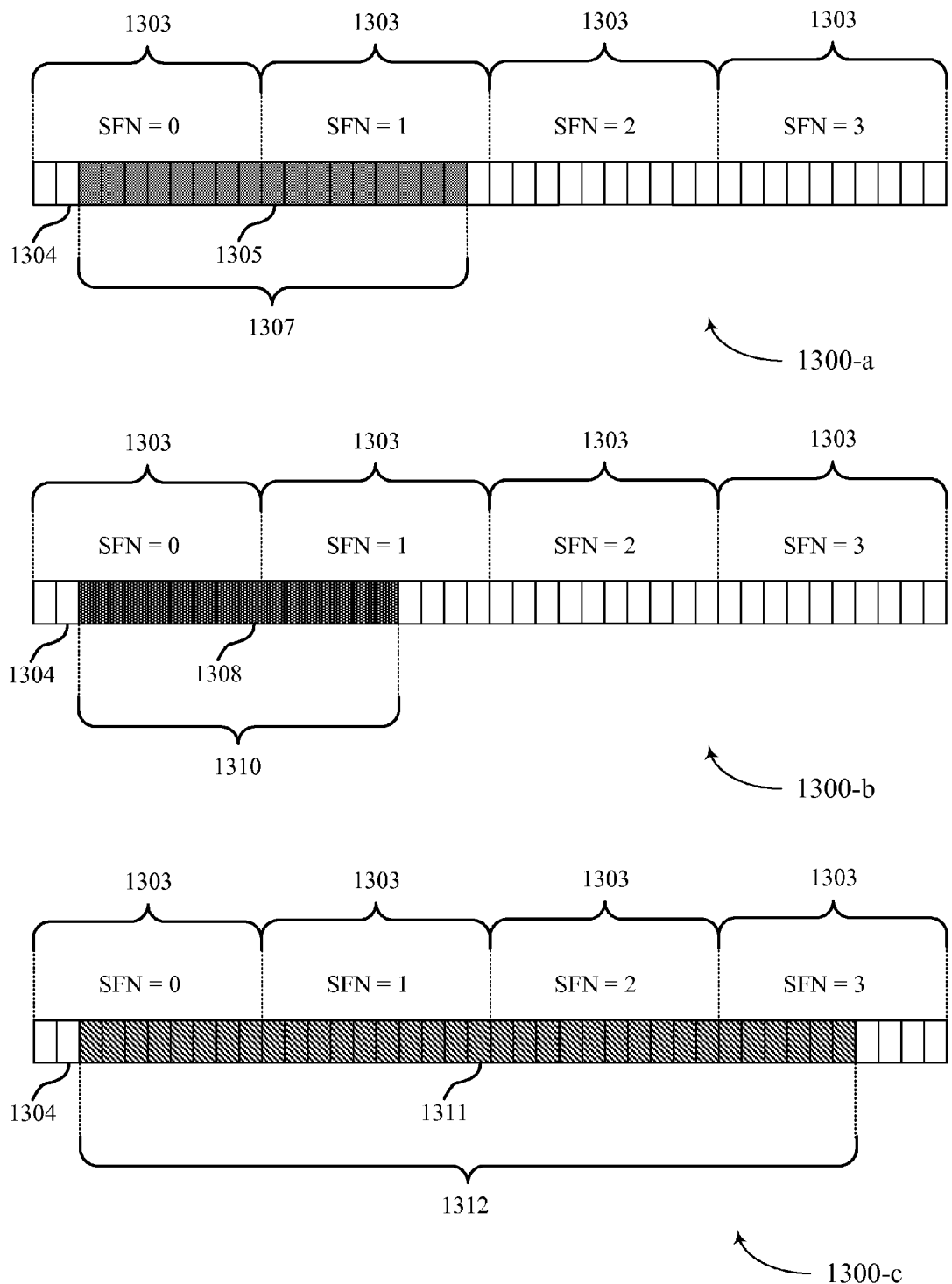
FIG. 13 illustrates an example of resource management for UEs under coverage enhancement in accordance with various aspects of the present disclosure.

In some examples, control-less or control-based monitoring, or both, may be dependent on TTI bundling length. FIG. 13 illustrates an example of resource management, utilizing TTI bundling, for UEs under coverage enhancement in accordance with various aspects of the present disclosure. FIG. 13 shows frame structure 1300 of a carrier within the systems 100 or 200 described with reference to FIGS. 1 and 2. The frame structure 1300 may be similar to the frame structures 302 and 1200 described with reference to FIGS. 3A, 3D, and 12.

The frame structure 1300 may include a number of frames 1303, each composed of ten (10) subframes 1304. In some examples, the frame structure 1300 illustrates an LTE carrier, which may be of frame structure type 1 or type 2, where each subframe is 1 ms in duration. In the example frame structure 1300, system frame numbers (SFN) 0 through 3 are illustrated; but those skilled in the art will recognize the general applicability this discussion to other portions of a frame structure and to other frames and subframes within a system.

A UE 115 (FIGS. 1 and 2) may be configured to monitor one control channel of bundling length N1, and/or a second control channel of bundling length N2, and/or a control-less data channel of a certain bundling length N3 or lengths. In such cases, each of the channels may be convolutionally encoded.

In some examples, the frame structure 1300 represents a common time resource with various physical channels depicted. For example, frame structure 1300-*a* may illustrate a control channel (e.g., PDCCH) TTI bundle 1305 with a bundling length 307. Frame structure 1300-*b* may illustrate a different control channel (e.g., EPDCCH) TTI bundle 1308 with a bundling length 1310. And frame structure 1300-*c* may illustrate a data channel (e.g., PDSCH) TTI bundle 1311 of bundling length 1312. A UE 115 may monitor all three channels beginning a subframe 1304.

A UE 115 may identify a TTI bundling length 1307 of the control channel TTI bundle 1305. The UE 115 may determine to monitor a search space 1260 (FIG. 12) based on the identified TTI bundling length 1307. The identified TTI bundling length 1307 may be indicative of a common search space or a device-specific search space. The UE 115 may receive signaling indicative of a TTI bundling length configuration, where determining to monitor the search space 1260 may be based on the identified TTI bundling length 1307 corresponding to the TTI bundling length configuration. In some examples, the search space may be monitored based on a set of TTI bundling lengths.

The UE 115 may identify a second TTI bundling length 1310 of the second control channel TTI bundle 1308. The UE 115 may determine to monitor a search space 1260, such as a second search space 1260, based on the identified second TTI bundling length 1310. The identified second TTI bundling length 1310 may be indicative of a device-specific search space or a common search space. The UE 115 may receive signaling indicative of a TTI bundling length configuration, where determining to monitor the search space 1260 may be based on the identified second TTI bundling length 1310 corresponding to the TTI bundling length configuration. In some examples, the search space may be monitored based on a set of TTI bundling lengths. At times, the frame structure 1300-*a* and the frame structure 1300-*b* may be frequency division multiplexed with other channels during the TTI, such as frame structure 1300-*c*. The second TTI bundling length 1310 may be different from the TTI bundling length 1307.

The UE 115 may identify a transmission TTI bundling length 1312 of the data channel TTI bundle 1311. At times, the data channel may be unassociated with either of the control channels, such as frame structure 1300-*a* and frame structure 1300-*b*. The UE 115 may determine to monitor another search space 1260, such as a third search space 1260, based on the identified data TTI bundling length 1312. The UE 115 may receive signaling indicative of a data TTI bundling length configuration, and determining to monitor the search space 1260 for data may be based on the identified TTI bundling length 1312 corresponding to the TTI bundling length configuration. In some examples, the UE 115 determines to monitor the search space 1260 based on a set of TTI bundling lengths. For example, the UE 115 may monitor a particular search space 1260 if a number of data channel bundles 1311 have a specified length. In some examples the data channel may be convolutionally encoded.

Figure 14:
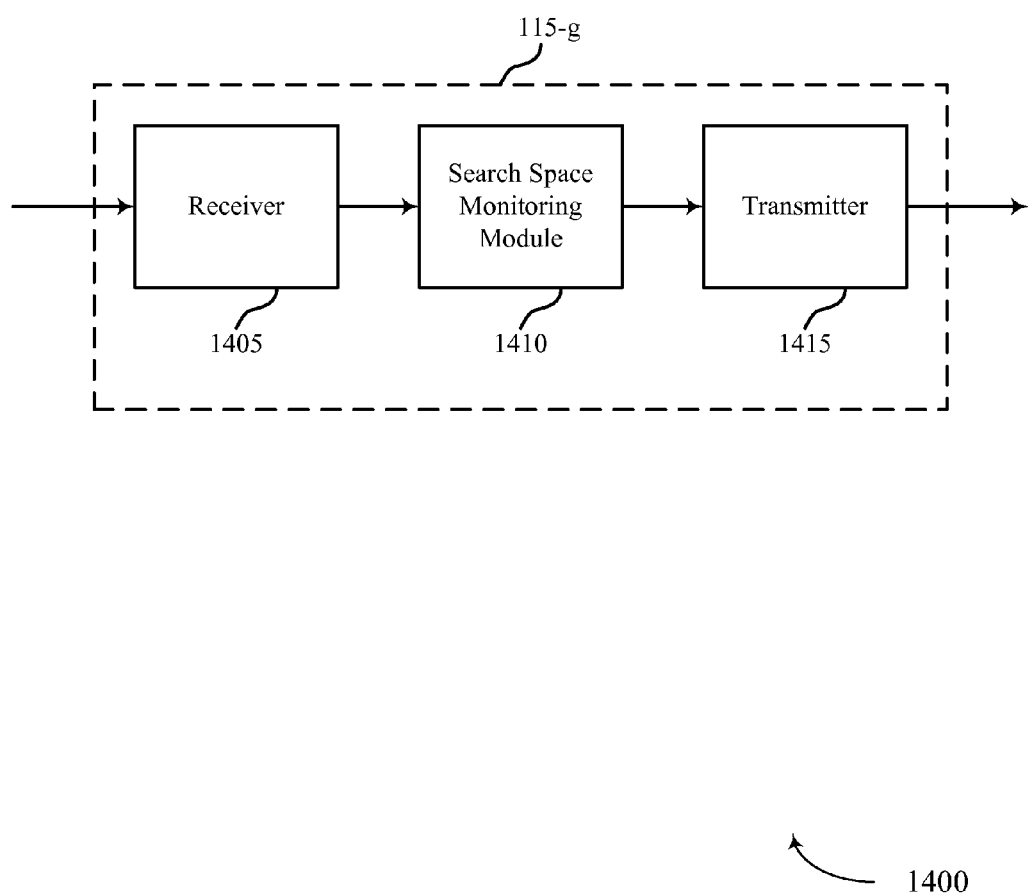
FIG. 14 shows a block diagram of a device configured for resource management for UEs under coverage enhancement in accordance with various aspects of the present disclosure.

FIG. 14 shows a block diagram 1400 of a UE 115-*g* configured for resource management for UEs under coverage enhancement in accordance with various aspects of the present disclosure. The UE 115-*g* may be an example of one or more aspects of a UEs 115 described with reference to FIGS. 1-13. The UE 115-*g* may include a receiver 1405, a search space monitoring module 1410, and/or a transmitter 1415. The UE 115-*g* may also include a processor. Each of these components may be in communication with one another.

The receiver 1405 may be configured to receive information such as packets, user data, and/or control information associated with various information channels (e.g., control channels, data channels, etc.). Information may be passed on to the search space monitoring module 1410, and to other components of the UE 115-*g*. In some examples, the receiver 1405 may be configured to receive signaling indicative of a TTI bundling length configuration, such that determining to monitor a search space may be based on the identified TTI bundling length corresponding to the TTI bundling length configuration.

The search space monitoring module 1410 may be configured to monitor a first search space during a TTI for a control channel. Additionally or alternatively, the search space monitoring module 1410 may be configured to monitor a second search space during the TTI for a data channel.

The transmitter 1415 may be configured to transmit the one or more signals received from other components of the UE 115-*g*. In some embodiments, the transmitter 1415 may be collocated with the receiver 1405 in a transceiver module. The transmitter 1415 may include a single antenna, or it may include a plurality of antennas.

Figure 15:
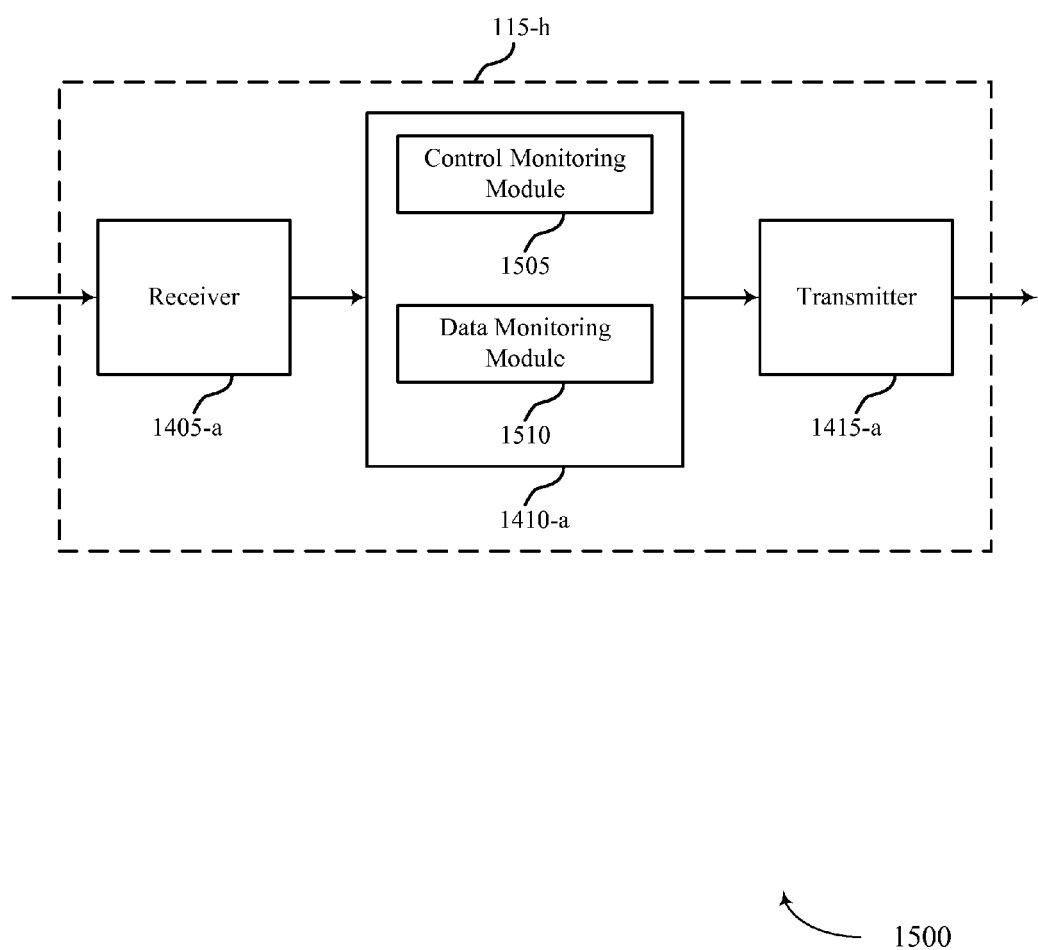
FIG. 15 shows a block diagram of a device configured for resource management for UEs under coverage enhancement in accordance with various aspects of the present disclosure.

FIG. 15 shows a block diagram 1500 of a UE 115-*h* configured for resource management for UEs under coverage enhancement in accordance with various embodiments. The UE 115-*h* may be an example of one or more aspects of a UE 115 described with reference to FIGS. 1-14. The UE 115-*h* may include a receiver 1415-*a*, a search space monitoring module 1410-*a*, and/or a transmitter 1415-*a*. The UE 115-*g* may also include a processor. Each of these components may be in communication with one another. The search space monitoring module 1410-*a* may also include a control monitoring module 1505, and a data monitoring module 1510.

The receiver 1415-*a* may be configured receive information which may be passed on to the search space monitoring module 1410-*a*, and to other components of the UE 115-*h*. The search space monitoring module 1410-*a* may be configured to perform the operations described above with reference to FIG. 14. The transmitter 1415-*a* may be configured to transmit the one or more signals received from other components of the UE 115-*h*.

The control monitoring module 1505 may be configured to monitor a first search space during a TTI for a control channel as described above with reference to FIG. 12. In some examples, the first search space is a common search space. The control monitoring module 1505 may also be configured to monitor a search space associated with broadcast transmissions during the TTI as described above with reference to FIG. 12.

In some examples, the data monitoring module 1510 is configured to monitor a second search space during the TTI for a data channel as described above with reference to FIG. 12. The data monitoring module 1510 may also be configured to enable an unassociated data monitoring mode for a UE 115-*h*, in which monitoring the second search space may be based on the enabled unassociated data monitoring mode, as described above with reference to FIG. 12.

Figure 16:
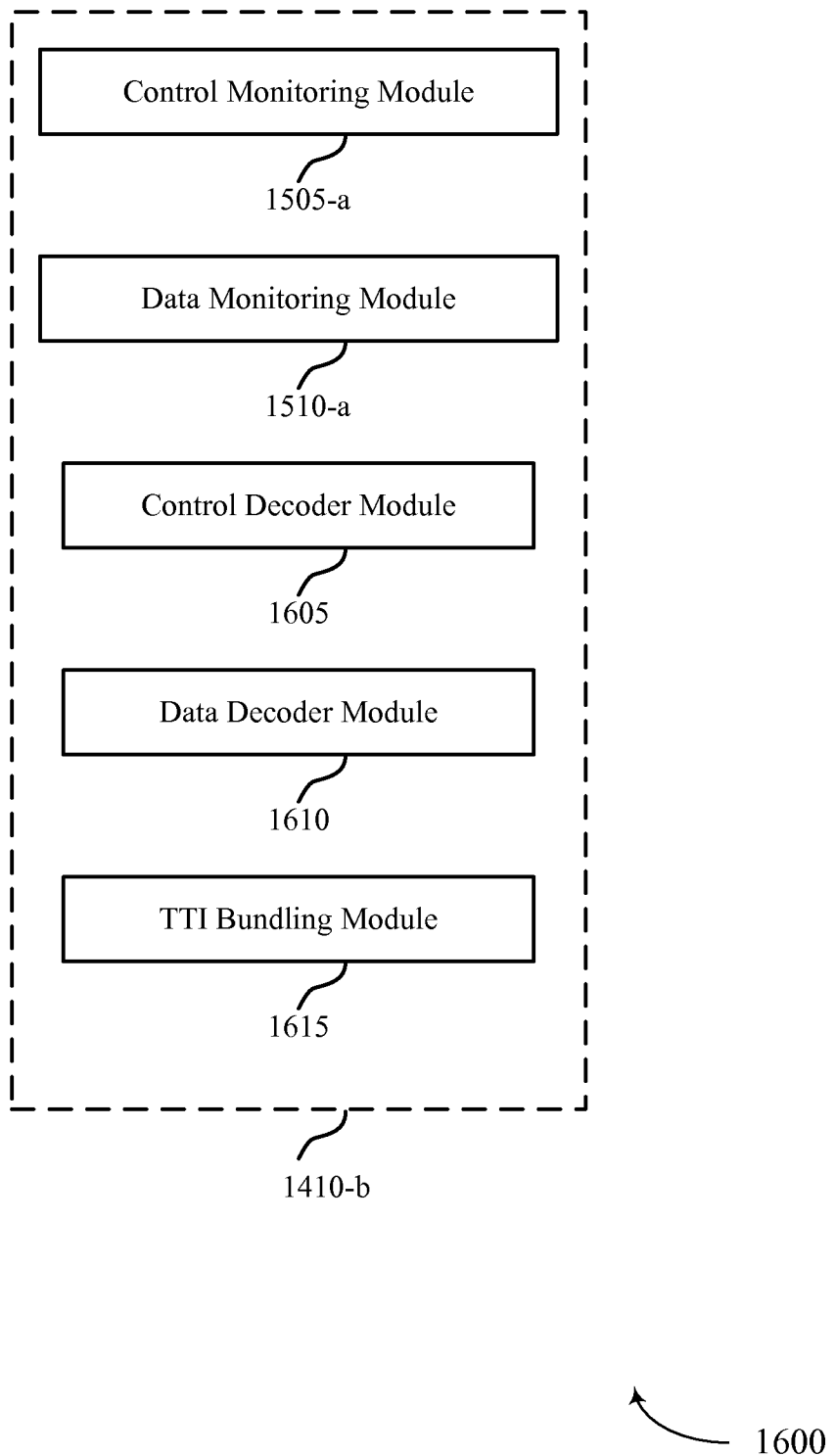
FIG. 16 shows a block diagram of a device configured for resource management for UEs under coverage enhancement in accordance with various aspects of the present disclosure.

FIG. 16 shows a block diagram 1600 of a search space monitoring module 1410-*b* for resource management for UEs under coverage enhancement in accordance with various aspects of the present disclosure. The search space monitoring module 1410-*b* may be an example of one or more aspects of a search space monitoring module 1410 described with reference to FIGS. 14-16. The search space monitoring module 1410-*b* may include a control monitoring module 1505-*a* and a data monitoring module 1510-*a*. These modules may perform the functions described above with reference to FIG. 16. The search space monitoring module 1410-*b* may also include a control decoder module 1605, a data decoder module 1610, and a TTI bundling module 1615.

In some cases, the control decoder module 1605 is configured to decode a control channel from the first search space as described above with reference to FIG. 12. In some examples, the control channel is a PDCCH or an enhanced PDCCH (EPDCCH), which schedules a corresponding shared channel.

The data decoder module 1610 may be configured to decode a data channel from the second search space as described above with reference to FIG. 12. In some examples, the data channel is a PDSCH unassociated with any control channel.

The TTI bundling module 1615 may be configured to identify one or more TTI bundling lengths of a control channel as described above with reference to FIG. 13. The TTI bundling module 1615 may also be configured to determine whether to monitor, or to monitor, the first search space based on the identified TTI bundling length or lengths, as described above with reference to FIG. 13. The TTI bundling module 1615 may also be configured to determine whether to monitor, or to monitor, the second search space based on the identified TTI bundling length or lengths, as described above with reference to FIG. 13. In some examples, the first or second search space may be monitored based on a plurality of TTI bundling lengths. The TTI bundling module 1615 may also be configured to identify a TTI bundling length or lengths of a data channel, as described above with reference to FIG. 13. The TTI bundling module 1615 may also be configured to determine whether to monitor the third search space based on the identified TTI bundling length or lengths, as described above with reference to FIG. 13. In some examples, the TTI bundling module 1615 is configured to determine whether to monitor a search space based on a plurality of TTI bundling lengths.

The components of the UE 115-*g*, UE 115-*h*, and/or the search space monitoring module 1410 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors.

Figure 17:
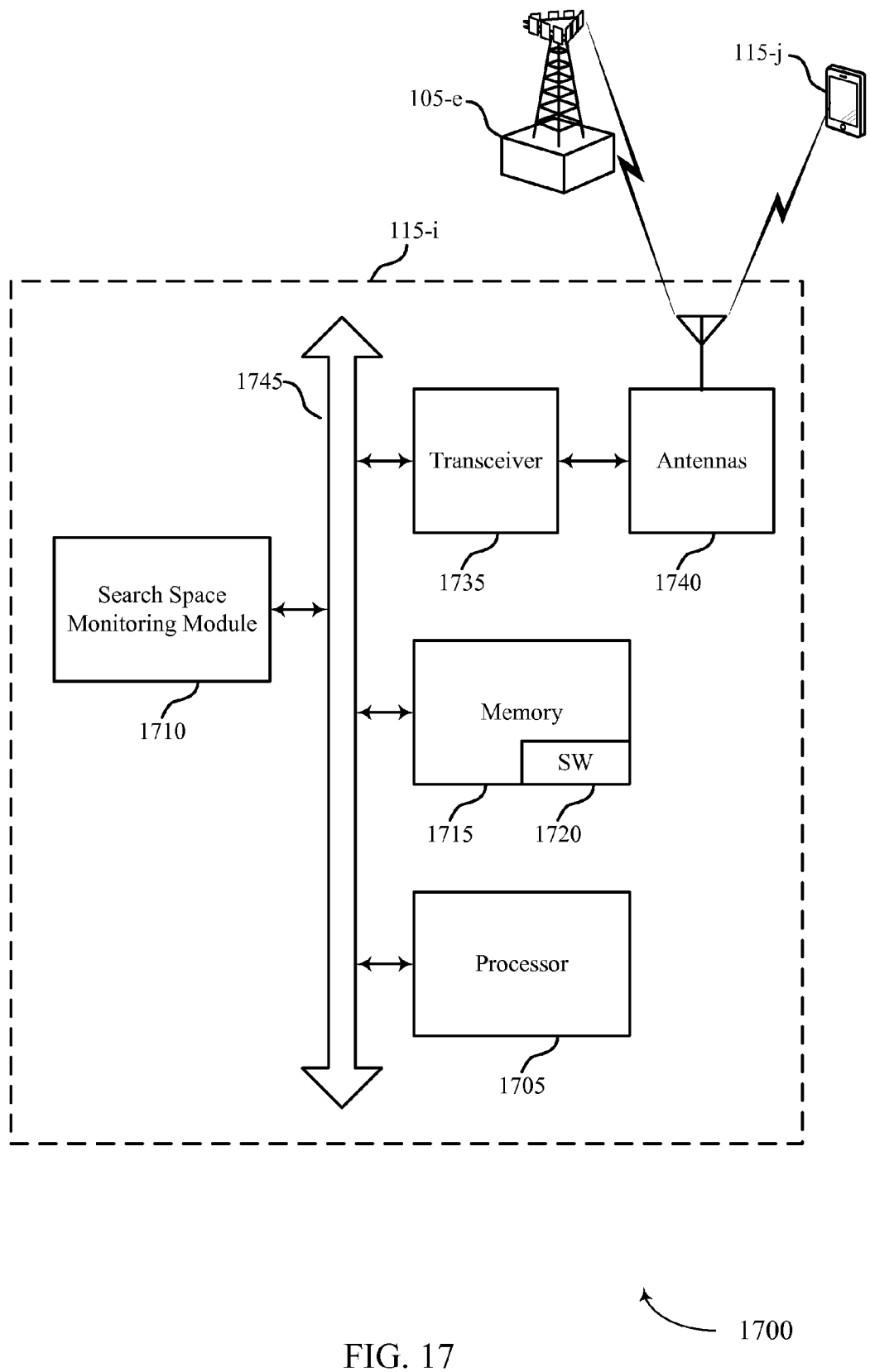
FIG. 17 shows a block diagram of a system configured for resource management for UEs under coverage enhancement in accordance with various aspects of the present disclosure.

FIG. 17 shows a diagram of a system 1700 configured for resource management for UEs under coverage enhancement in accordance with various aspects of the present disclosure. System 1700 may include a UE 115-*h*, which may be an example of a UE 115 described with reference to FIGS. 1-16. The UE 115-I may include a search space monitoring module 1710, which may be an example of a search space monitoring module described with reference to FIGS. 14-16. In some examples, the UE 115-*i* is a low complexity UE 115, such as an MTC UE 115, which may be deployed in a meter or sensor. In other examples, however, the UE 115-*g* may include components for bi-directional voice and data communications including components for transmitting communications and components for receiving communications.

The UE 115-*i* may include a processor 1705, memory 1715 (including software (SW) 1720), a transceiver 1735, and one or more antenna(s) 1740, which each may communicate, directly or indirectly, with one another (e.g., via one or more buses 1745). The transceiver 1735 may be configured to communicate bi-directionally, via the antenna(s) 1740 and/or one or more wired or wireless links, with various networks, as described above. For example, the transceiver 1735 may be configured to communicate bi-directionally with a base station 105-*e*. The transceiver 1735 may include a modem configured to modulate the packets and provide the modulated packets to the antenna(s) 1740 for transmission, and to demodulate packets received from the antenna(s) 1740. While the UE 115-*i* may include a single antenna 1740, the UE 115-*i* may also have multiple antennas 1740 capable of concurrently transmitting and/or receiving multiple wireless transmissions. The transceiver 1735 may also be capable of concurrently communicating with one or more base stations 105.

The memory 1715 may include random access memory (RAM) and read only memory (ROM). The memory 1715 may store computer-readable, computer-executable software/firmware code 1720 including instructions that are configured to, when executed, cause the processor module 1705 to perform various functions described herein (e.g., monitoring search spaces for control and/or data channels, blind decoding control and/or data channels, identifying TTI bundling, etc.). Alternatively, the software/firmware code 1720 may not be directly executable by the processor module 1705 but be configured to cause a computer (e.g., when compiled and executed) to perform functions described herein. The processor 1705 may include an intelligent hardware device, e.g., a central processing unit (CPU), a microcontroller, an ASIC, etc. may include RAM and ROM. In some examples, the search space monitoring module 1710 may be a module of the processor 1705.

Figure 18:
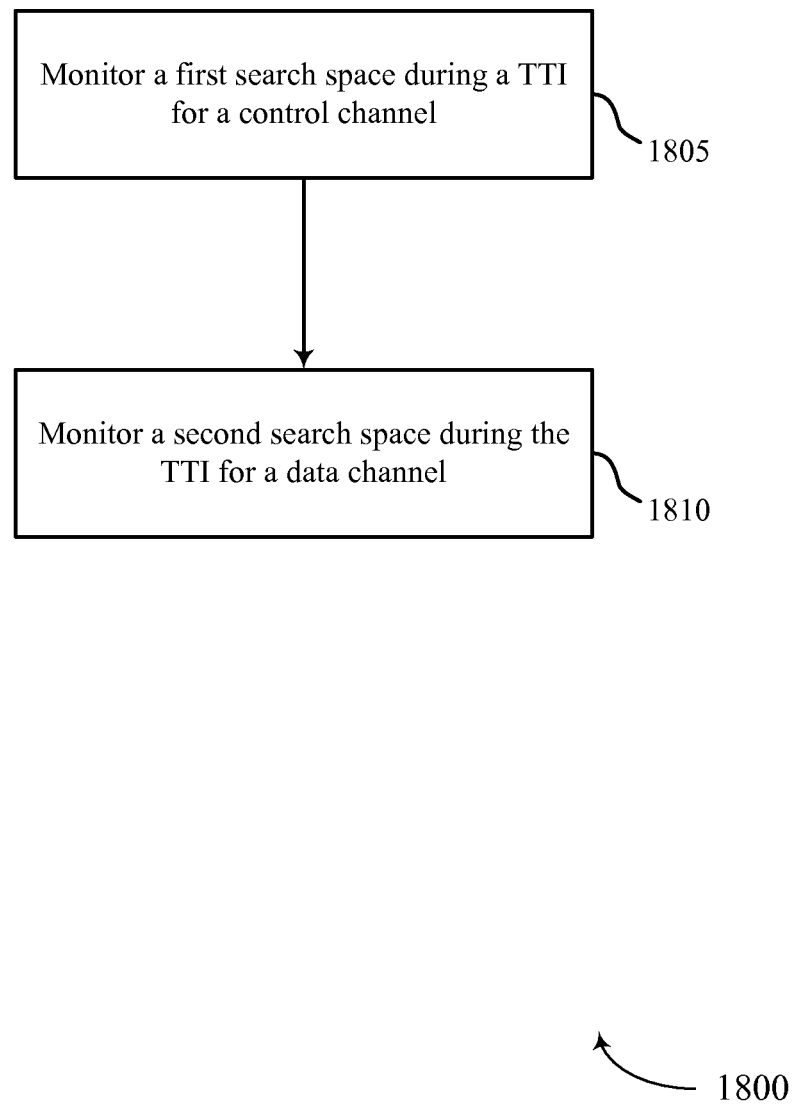
FIG. 18 shows a flowchart illustrating a method for resource management for UEs under coverage enhancement in accordance with various aspects of the present disclosure.

FIG. 18 shows a flowchart 1800 illustrating a method for resource management for UEs under coverage enhancement in accordance with various aspects of the present disclosure. The functions of flowchart 1800 may be implemented by a UE 115 or one or more of its components as described with reference to FIGS. 1-17. In certain examples, one or more of the blocks of the flowchart 1800 may be performed by the search space monitoring module 1410 or 1710, as described with reference to FIGS. 14-17.

At block 1805, the method may include monitoring a first search space during a TTI for a first channel, as described above with reference to FIG. 12. The first channel may be a control channel. In certain examples, the functions of block 1805 may be performed by the control monitoring module 1505 as described above with reference to FIG. 15.

At block 1810, the method may include monitoring a second search space during the TTI for a second channel as described above with reference to FIG. 12. The second channel may be a data channel. In certain examples, the functions of block 1810 may be performed by the data monitoring module 1510 as described above with reference to FIG. 15.

Figure 19:
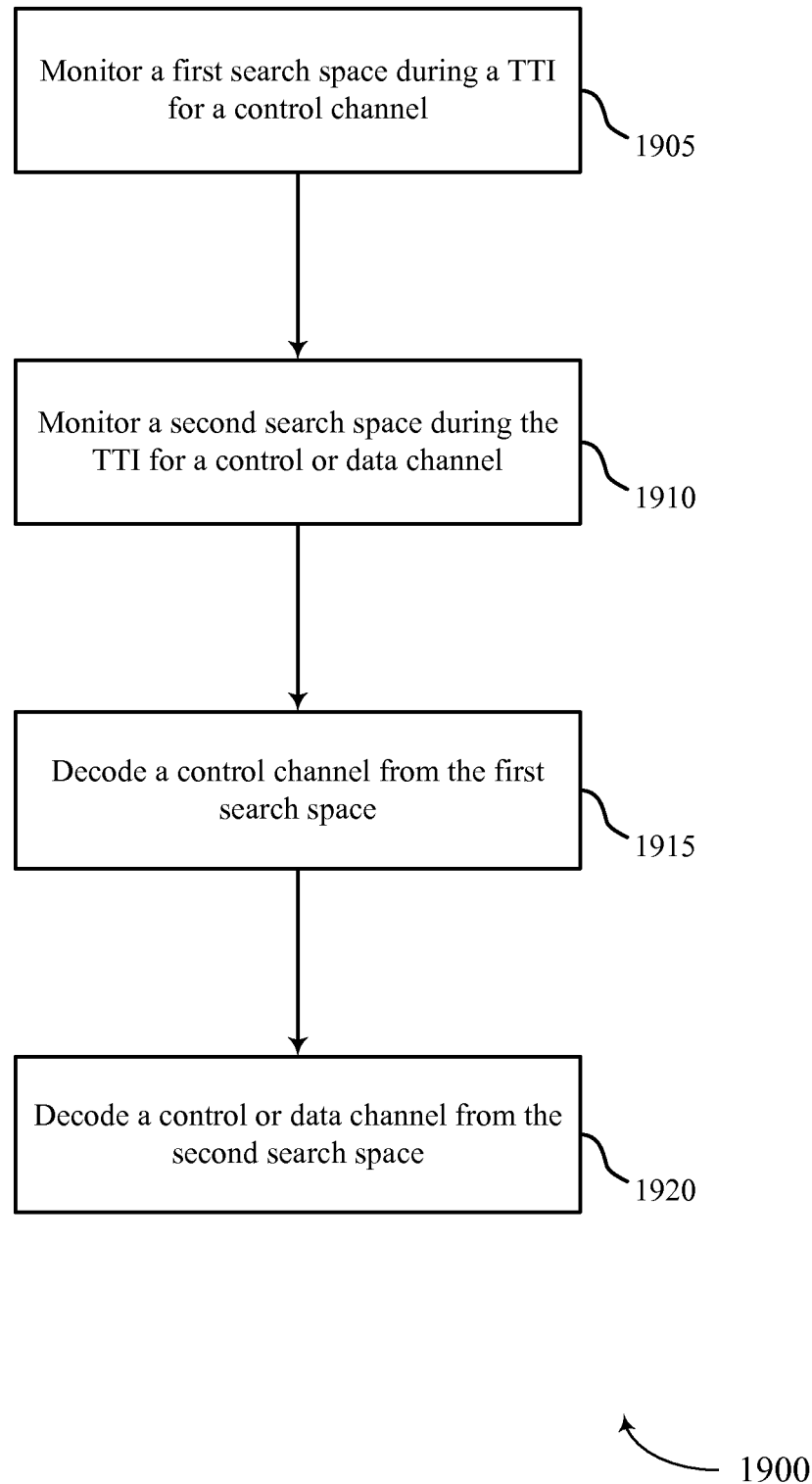
FIG. 19 shows a flowchart illustrating a method for resource management for UEs under coverage enhancement in accordance with various aspects of the present disclosure.

FIG. 19 shows a flowchart 1900 illustrating a method for resource management for UEs under coverage enhancement in accordance with various aspects of the present disclosure. The functions of flowchart 1900 may be implemented by a UE 115 or one or more of its components as described with reference to FIGS. 1-17. In certain examples, one or more of the blocks of the flowchart 1900 may be performed by the search space monitoring module 1410 or 1710 as described with reference to FIGS. 14-17. The method described in flowchart 1900 may also incorporate aspects of flowchart 1800 of FIG. 18.

At block 1905, the method may include monitoring a first search space during a TTI for a control channel, as described above with reference to FIG. 12. In certain examples, the functions of block 1905 may be performed by the control monitoring module 1505, as described above with reference to FIG. 15.

At block 1910, the method may include monitoring a second search space during the TTI for a control or data channel, as described above with reference to FIG. 12. In certain examples, the functions of block 1910 may be performed by the data monitoring module 1510 as described above with reference to FIG. 15.

At block 1915, the method may include decoding a control channel from the first search space, as described above with reference to FIG. 12. In certain examples, the functions of block 1915 may be performed by the control decoder module 1605 as described above with reference to FIG. 16.

At block 1920, the method may include decoding a control or data channel from the second search space, as described above with reference to FIG. 12. In certain examples, the functions of block 1920 may be performed by the data decoder module 1610 as described above with reference to FIG. 16.

Figure 20:
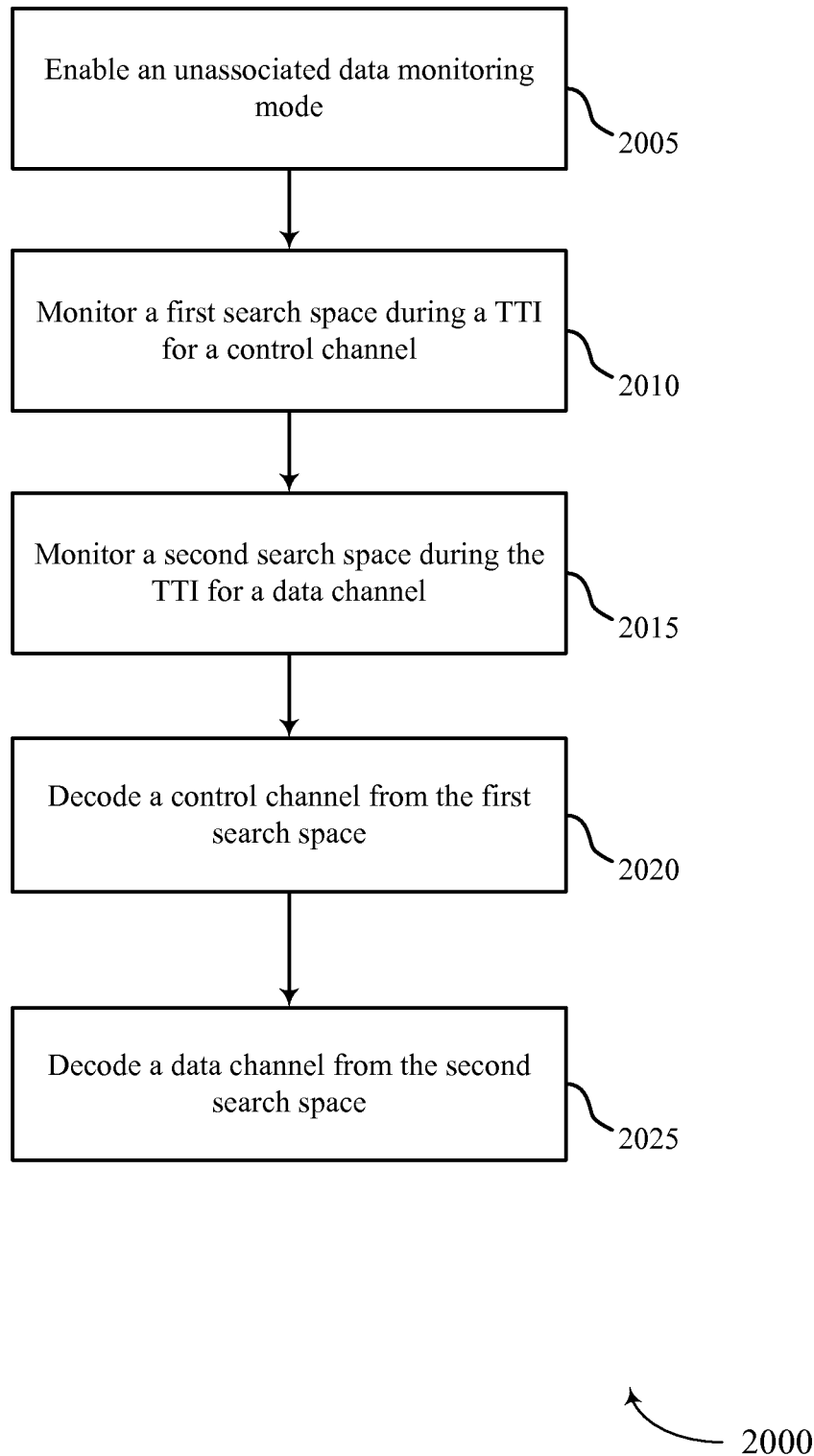
FIG. 20 shows a flowchart illustrating a method for resource management for UEs under coverage enhancement in accordance with various aspects of the present disclosure.

FIG. 20 shows a flowchart 2000 illustrating a method for resource management for UEs under coverage enhancement in accordance with various aspects of the present disclosure. The functions of flowchart 2000 may be implemented by a UE 115 or one or more of its components as described with reference to FIGS. 1-17. In certain examples, one or more of the blocks of the flowchart 2000 may be performed by the search space monitoring module 1410 or 1710, as described with reference to FIGS. 14-17. The method described in flowchart 2000 may also incorporate aspects of flowcharts 1800 and 1900 of FIGS. 18-19.

At block 2005, the method may include enabling an unassociated data monitoring mode, as described above with reference to FIG. 12. The functions of block 2005 may be performed by the data monitoring module 1510, as described with reference to FIG. 15.

At block 2010, the method may include monitoring a first search space during a TTI for a control channel, as described above with reference to FIG. 12. In certain examples, the functions of block 2010 may be performed by the control monitoring module 1505 as described above with reference to FIG. 15.

At block 2015, the method may include monitoring a second search space during the TTI for a data channel, as described above with reference to FIG. 12. In certain examples, the functions of block 2015 may be performed by the data monitoring module 1510 as described above with reference to FIG. 15.

At block 2020, the method may include decoding a control channel from the first search space, as described above with reference to FIG. 12. In certain examples, the functions of block 2020 may be performed by the control decoder module 1605 as described above with reference to FIG. 16.

At block 2025, the method may involve decoding a data channel from the second search space, as described above with reference to FIG. 12. In certain examples, the functions of block 2025 may be performed by the data decoder module 1610, as described above with reference to FIG. 16.

Figure 21:
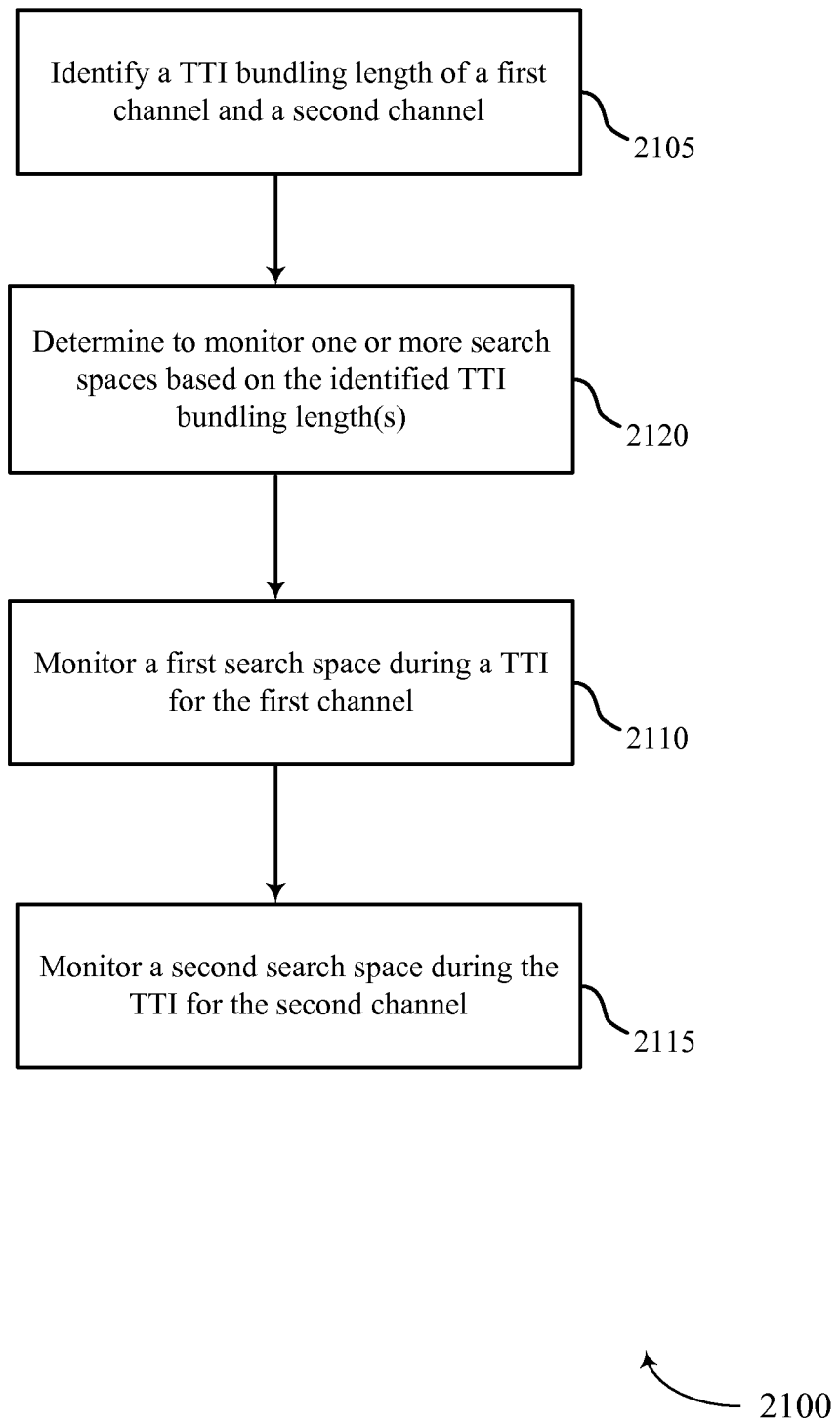
FIG. 21 shows a flowchart illustrating a method for resource management for UEs under coverage enhancement in accordance with various aspects of the present disclosure.

FIG. 21 shows a flowchart 2100 illustrating a method for resource management for UEs under coverage enhancement in accordance with various aspects of the present disclosure. The functions of flowchart 2100 may be implemented by a UE 115 or one or more of its components as described with reference to FIGS. 1-17. In certain examples, one or more of the blocks of the flowchart 2100 may be performed by the search space monitoring module 1410 or 1710 as described with reference to FIGS. 14-17. The method described in flowchart 2100 may also incorporate aspects of flowcharts 1800 through 2000 of FIGS. 18-20.

At block 2105, the method may include identifying at least one TTI bundling length of a first channel and a TTI bundling length of a second channel, as described above with reference to FIG. 13. The first channel may be a control channel or data channel and the second channel may be a control or data channel. In some cases, both the first and second channels are control channels. In certain examples, the functions of block 2105 may be performed by the TTI bundling module 1615 as described above with reference to FIG. 16.

At block 2110, the method may include determining to monitor a first search space for the first channel and a second search space for the second channel based on the identified TTI bundling length or lengths, as described above with reference to FIG. 13. In certain examples, the functions of block 2110 may be performed by the TTI bundling module 1615 as described above with reference to FIG. 16.

At block 2115, the method may involve monitoring the first search space for the first channel during a TTI based at least in part on the identified TTI bundling length, as described above with reference to FIG. 13. In certain examples, the functions of block 2115 may be performed by the control monitoring module 1505 as described above with reference to FIG. 15.

At block 2120, the method may involve monitoring the second search space during the TTI for the second channel, as described above with reference to FIG. 13. The second channel may be a data channel. In certain examples, the functions of block 2120 may be performed by the data monitoring module 1510, as described above with reference to FIG. 15.

It should be noted that the method illustrated with flowcharts 1800, 1900, 2000, and 2100 are example implementations, and that the operations of the methods, and the steps may be rearranged or otherwise modified such that other implementations are possible.

The detailed description set forth above in connection with the appended drawings describes examples and example embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer, including non-transitory media. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein, but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication, comprising:
monitoring, at a user equipment (UE) and during a downlink transmission time interval (TTI), a first search space for a first channel;
monitoring, at the UE and during the downlink TTI, a second search space for a second channel, wherein the first channel is a control channel and the second channel is a data channel;
performing a first blind decode to blindly decode the control channel from the first search space; and
performing a second blind decode to blindly decode the data channel from the second search space.

2. The method of claim 1, wherein the control channel comprises a physical control channel that schedules a corresponding shared data channel; and
wherein the data channel comprises a physical shared channel unassociated with any control channel.

3. The method of claim 1, wherein the data channel is convolutionally encoded.

4. The method of claim 1, further comprising:
monitoring a third search space during the downlink TTI for an additional control channel associated with broadcast transmissions.

5. The method of claim 1, further comprising:
enabling an unassociated data monitoring mode for the UE, wherein monitoring the second search space is based at least in part on the enabled unassociated data monitoring mode.

6. The method of claim 1, wherein the first search space comprises a common search space.

7. The method of claim 1, wherein the first search space is monitored based at least in part on a first TTI bundling length of the first channel and the second search space is monitored based at least in part on a second TTI bundling length of the second channel.

8. An apparatus for wireless communication, comprising:
means for monitoring, at a user equipment (UE) and during a downlink transmission time interval (TTI), a first search space for a first channel;
means for monitoring, at the UE and during the downlink TTI, a second search space for a second channel, wherein the first channel is a control channel and the second channel is a data channel;
means for performing a first blind decode to blindly decode the control channel from the first search space; and
means for performing a second blind decode to blindly decode the data channel from the second search space.

9. The apparatus of claim 8, wherein the control channel comprises a physical control channel that schedules a corresponding shared data channel; and
wherein the data channel comprises a physical shared channel unassociated with any control channel.

10. The apparatus of claim 8, wherein the data channel is convolutionally encoded.

11. The apparatus of claim 8, further comprising:
means for monitoring a third search space during the downlink TTI for an additional control channel associated with broadcast transmissions.

12. The apparatus of claim 8, further comprising:
means for enabling an unassociated data monitoring mode for a user equipment (UE), wherein monitoring the second search space is based at least in part on the enabled unassociated data monitoring mode.

13. The apparatus of claim 8, wherein the first search space comprises a common search space.

14. An apparatus for wireless communication, comprising:
a processor;
memory in electronic communication with the processor; and
instructions stored in the memory and operable, when executed by the processor, to cause the apparatus to:
monitor, at a user equipment (UE) and during a downlink transmission time interval (TTI), a first search space for a first channel;
monitor, at the UE and during the downlink TTI, a second search space for a second channel, wherein the first channel is a control channel and the second channel is a data channel;
perform a first blind decode to blindly decode the control channel from the first search space; and
perform a second blind decode to blindly decode the data channel from the second search space.

15. The apparatus of claim 14, wherein the control channel comprises a physical control channel that schedules a corresponding shared data channel; and
wherein the data channel comprises a physical shared channel unassociated with any control channel.

16. The apparatus of claim 14, wherein the data channel is convolutionally encoded.

17. The apparatus of claim 14, wherein the instructions are operable to cause the apparatus to:
monitor a third search space during the downlink TTI for an additional control channel associated with broadcast transmissions.

18. The apparatus of claim 14, wherein the instructions are operable to cause the apparatus to:
enable an unassociated data monitoring mode for the UE, wherein monitoring the second search space is based at least in part on the enabled unassociated data monitoring mode.

19. A non-transitory computer-readable medium storing code for wireless communication, the code comprising instructions executable to:
monitor, at a user equipment (UE) and during a downlink transmission time interval (TTI), a first search space for a first channel;
monitor, at the UE and during the downlink TTI, a second search space for a second channel, wherein the first channel is a control channel and the second channel is a data channel;
perform a first blind decode to blindly decode the control channel from the first search space; and
perform a second blind decode to blindly decode the data channel from the second search space.

* * * * *